US011093408B1

United States Patent
Solganik et al.

(10) Patent No.: US 11,093,408 B1
(45) Date of Patent: Aug. 17, 2021

(54) SYSTEM AND METHOD FOR OPTIMIZING WRITE AMPLIFICATION OF NON-VOLATILE MEMORY STORAGE MEDIA

(71) Applicant: Lightbits Labs Ltd., Kfar Saba (IL)

(72) Inventors: Alexander Solganik, Giv'atayim (IL); Adir Gabai, Giv'at Shmuel (IL); Shmuel Ben-Yehuda, Haifa (IL); Eran Kirzner, Moshav Elishama (IL); Abel Alkon Gordon, Haifa (IL)

(73) Assignee: Lightbits Labs Ltd., Kfar Saba (IL)

( * ) Notice: Subject to any disclaimer, the term of this patent is extended or adjusted under 35 U.S.C. 154(b) by 0 days.

(21) Appl. No.: 16/429,304

(22) Filed: Jun. 3, 2019

Related U.S. Application Data

(63) Continuation-in-part of application No. 16/014,004, filed on Jun. 21, 2018, now Pat. No. 10,628,301, which is a continuation-in-part of application No. 15/963,131, filed on Apr. 26, 2018.

(51) Int. Cl.
*G06F 12/02* (2006.01)
*G06F 12/1045* (2016.01)
*G06F 12/0804* (2016.01)

(52) U.S. Cl.
CPC ...... *G06F 12/1054* (2013.01); *G06F 12/0246* (2013.01); *G06F 12/0269* (2013.01); *G06F 12/0804* (2013.01); *G06F 12/0253* (2013.01); *G06F 2212/305* (2013.01); *G06F 2212/608* (2013.01); *G06F 2212/7201* (2013.01); *G06F 2212/7205* (2013.01); *G06F 2212/7207* (2013.01); *G06F 2212/7209* (2013.01)

(58) Field of Classification Search
CPC ............. G06F 12/0246; G06F 12/0253; G06F 12/0261; G06F 12/0269; G06F 2212/7205; G06F 12/1054
See application file for complete search history.

(56) References Cited

U.S. PATENT DOCUMENTS

| 10,417,243 B1* | 9/2019 | Singh ................ G06F 16/24552 |
| 10,812,319 B1* | 10/2020 | Prakash .............. G06F 11/3006 |
| 2012/0272132 A1* | 10/2012 | Mondal ................. G06F 16/957 715/234 |
| 2014/0136575 A1 | 5/2014 | Zhao et al. |

(Continued)

OTHER PUBLICATIONS

U.S. Office Action of U.S. Appl. No. 16/449,610 dated Jul. 20, 2020.
(Continued)

*Primary Examiner* — Than Nguyen
(74) *Attorney, Agent, or Firm* — Pearl Cohen Zedek Latzer Baratz LLP

(57) ABSTRACT

A system and a method of managing storage of cached data objects on a non-volatile memory (NVM) computer storage media including at least one NVM storage device, by at least one processor, may include: receiving one or more data objects having respective Time to Live (TTL) values; storing the one or more data objects and respective TTL values at one or more physical block addresses (PBAs) of the storage media; and performing a garbage collection (GC) process on one or more PBAs of the storage media based on at least one TTL value stored at a PBA of the storage media.

16 Claims, 12 Drawing Sheets

(56) References Cited

U.S. PATENT DOCUMENTS

| | | | |
|---|---|---|---|
| 2014/0372490 A1* | 12/2014 | Barrus | G06F 16/1873 |
| | | | 707/814 |
| 2016/0313922 A1 | 10/2016 | Kojima | |
| 2016/0350213 A1 | 12/2016 | Patil et al. | |
| 2016/0380977 A1* | 12/2016 | Bean | H04L 63/1483 |
| | | | 726/12 |
| 2017/0054824 A1 | 2/2017 | Friedman et al. | |
| 2017/0153848 A1* | 6/2017 | Martineau | G06F 3/0643 |
| 2017/0187533 A1* | 6/2017 | Raj | H04L 9/085 |
| 2018/0364924 A1 | 12/2018 | Fukutomi et al. | |
| 2020/0133840 A1 | 4/2020 | Zhou et al. | |

OTHER PUBLICATIONS

U.S. Office Action of U.S. Appl. No. 16/014,004 dated Aug. 5, 2019.

* cited by examiner

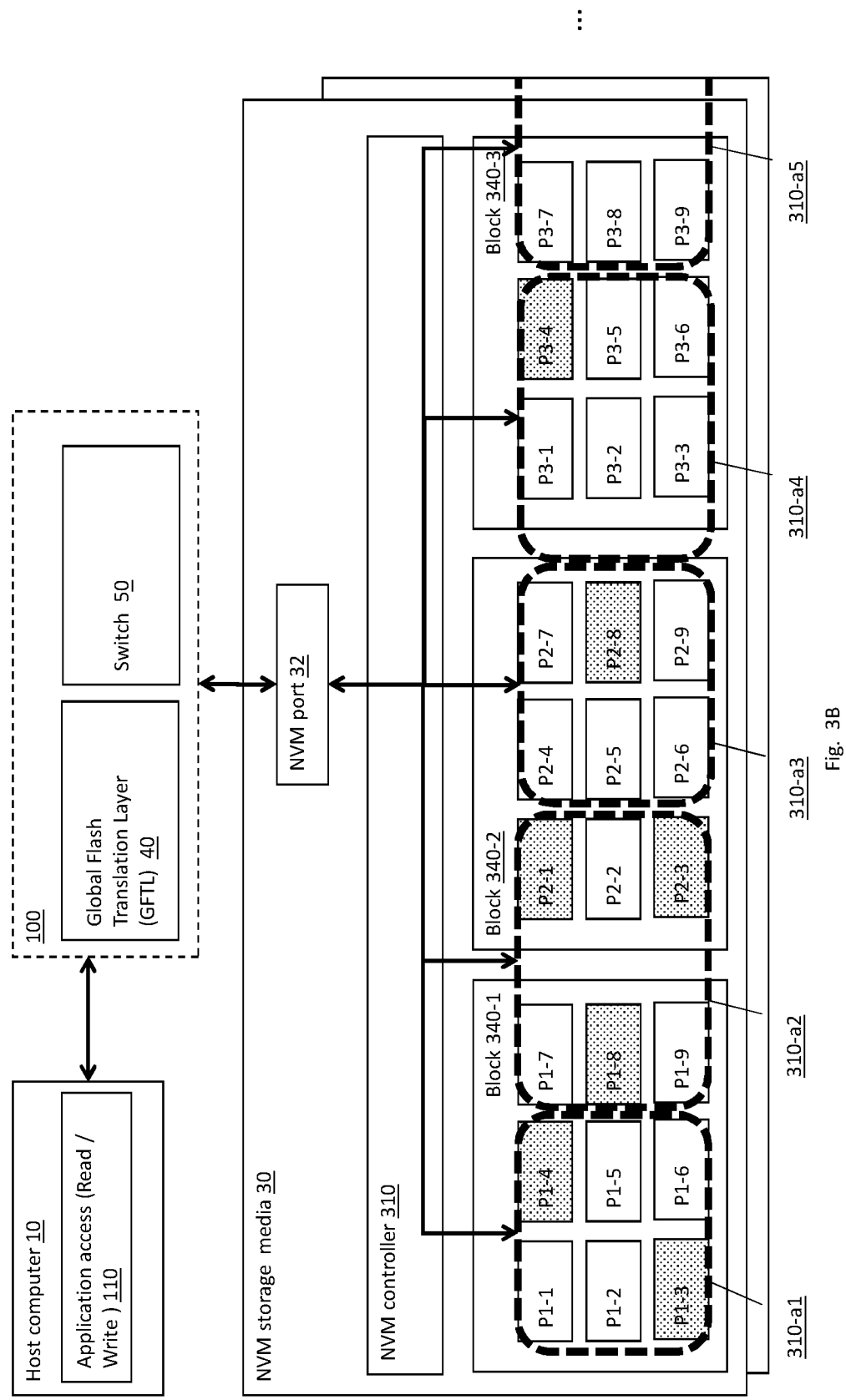

SYSTEM AND METHOD FOR OPTIMIZING WRITE AMPLIFICATION OF NON-VOLATILE MEMORY STORAGE MEDIA

RELATED APPLICATION DATA

The present application is a continuation-in-part (CIP) of prior U.S. application Ser. No. 16/014,004 filed on Jun. 21, 2018, entitled "SYSTEM AND METHOD FOR OPTIMIZING WRITE AMPLIFICATION OF NON-VOLATILE MEMORY STORAGE MEDIA" and Ser. No. 15/963,131 filed on Apr. 26, 2018, entitled "SYSTEM AND METHOD FOR COMPUTER DATA GARBAGE COLLECTION ACCELERATION USING PEER TO PEER DATA TRANSFERS", both incorporated herein by reference in their entirety.

FIELD OF THE INVENTION

The present invention relates generally to non-volatile storage systems. More specifically, the present invention relates to using address virtualization in non-volatile storage systems.

BACKGROUND OF THE INVENTION

Non-volatile memory (NVM) devices, such as flash memory devices and solid-state drives (SSDs) have become ubiquitous in a variety of computerized applications. The inherent speed of data fetching from NMV devices, as well as the lack of moving mechanical parts and relative small aspect ratio have made these devices a preferable selection to hard-disk storage systems, in applications ranging from Internet-of-Things (IoT) devices to cloud-based servers.

The internal storage of NVM devices is divided into blocks, also known as "erase blocks", which are further divided into equally-sized pages, so that each block is a collection of pages. Blocks are defined as the smallest units that can be erased, whereas pages are defined as the smallest units that can be written.

In order to reuse (e.g.: re-write) a page, all the pages belonging to the same block must be erased. Thus, flash devices always write new data into free pages, that have been previously erased, even if a previous version of the data has been written in a different page. When this happens, the page holding the old data becomes invalid, but cannot be re-used until the block holding it is erased in its entirety. The number of times a block can be erased is limited and may affect the endurance of the flash device.

Flash devices have an internal garbage-collection (GC) mechanism, responsible for reclaiming invalid pages. As known in the art, GC mechanisms may scan for candidate blocks to be reclaimed (e.g., blocks that have more invalid pages than valid pages). The valid pages of candidate blocks may be read and copied to a new block. Finally, the GC mechanism may erase the whole block and may mark it as free, so it could be re-used for future writes.

When a host computer writes a data object (e.g., a variable, a data structure, a file, an entry in a database, etc.) to an NVM device, it may specify a desired location for the data object using a virtual address in an application address space. The virtual address may for example, include a namespace, which can be thought of as a virtual hard drive, and a virtual user block address (UBA), which may be an offset from the namespace within the application address space. The NVM device may store the data object in any physical address within the NVM and may also move the physical data storage location as a result of GC activity. The NVM implements a translation layer to maintain the association of each data object's application address with the physical address on the NVM device.

Write operations can be divided into two classes: writes generated by the internal GC mechanism and writes generated by the external host computer. The total number of concurrent writes a device can handle is limited, thus it is desirable to minimize the number of write operations generated by the internal GC process so that the flash device will be able to handle more external host write operations. Moreover, reducing the number of GC writes directly reduces the number of required erasure cycles (also known as program-erase (PE) cycles), thus improving the lifetime and endurance of the NVM device.

The write amplification (WA) parameter is a metric used to measure the relation between external write operations and GC write operations, and is defined in the following equation Eq. 1:

$$WA=(\text{External-Writes}+\text{GC-Writes})/(\text{External-Writes}). \qquad \text{Eq. 1}$$

It is desired to keep the WA as low as possible. For example: when WA is equal to 1 (optimal value), there are no GC write operations.

NVM devices use fixed-size user data blocks, and applications are forced to use this user data-block size to store data. Applications that require management of data that is not aligned with an integer product of the user data block size (e.g., file system, database, compressed block device, key/value storage) need to implement their own translation layer and GC mechanism. For example, a key/value application that writes objects of variable sizes, needs to know the virtual user block address (UBA) wherein each data object is stored. If data objects are not aligned to the virtual user data block size, the key/value application will need to reclaim invalid space.

The translation layer and GC mechanism of the application works in parallel to the translation layer and internal GC mechanism of the NVM device, resulting in a non-cooperative duplicated process that increases the WA of the overall system, reduces the performance and shortens the life-span of the NVM device.

"Big Data" systems, such as systems that employ machine learning algorithms require fast-access storage of huge amounts of data, rendering in-memory cache storage inadequate or too expensive to produce. State-of-the-art storage systems have therefore turned to caching data on non-volatile memory (NVM) devices, such as flash-based hard drives or solid-state drives (SSDs) that provide low latency for storage of cache data.

As known in the art, a major challenge in using cache storage systems is avoiding cache staleness or expiration. Developers commonly store data to cache and delete or update the stored data when it changes. This strategy often proves inconvenient, as application cache handling code may become riddled throughout the source code. Another strategy for handling cache staleness or expiration and avoiding code complexity includes writing data to the cache memory, in conjunction with an expiration time, so that data will automatically expire when the expiration time has elapsed.

Commercially available storage systems may include support for handling expired data, for example, by periodically 'crawling' though cached objects and evicting or purging expired items. Such an approach may be adequate for handling relatively small amounts of cached data objects but may become highly ineffective when handling large amounts of cached objects that may be stored, for example, on a NAND Flash. This is due to the increased read amplification and/or write amplification, induced by the intensive reading and writing of cached data elements, thus lowering the overall system's performance and the NVM device's lifetime.

This problem may become even more severe when the storage is accessed over or via a computer network (e.g., over a local area network (LAN) or wide area network (WAN)), as the network may become a bottleneck and, for example, reducing the performance services within an organization.

SUMMARY

Therefore, a system and a method for combining the management of the GC mechanisms and translation layers, of both the NVM device and application, that would enable storage of variable-sized objects (e.g., compressed data blocks or key/value objects) to be stored in flash media while minimizing the overall WA of the system is therefore desired.

Furthermore, a system and a method for removing or evicting expired and stored cached data objects, while avoiding additional read amplification, write amplification, code complexity and/or network overloading is desired.

Embodiments provide herein a method of managing non-volatile memory (NVM) computer storage media including at least one NVM storage device, by at least one processor. The method may include:
  a. setting a write pointer to point to a write unit (WU) having a logical address space;
  b. receiving at least one data object, having or being described by a user block address (UBA);
  c. mapping the UBA to a logical block address (LBA) within the WU pointed by the write pointer;
  d. repeating steps b and c until the address space of the WU is full;
  e. storing the content of the WU in at least one physical block address (PBA) of the NVM storage media;
  f. updating the write pointer to point to a next WU; and
  g. repeating steps b thru f with the next WU.

Embodiments of the method may continue (e.g. perpetually) at least as long as data objects are received and are required to be stored in a physical address of the NVM storage media.

According to some embodiments, mapping the UBA to an LBA may include: updating the mapping between the UBA and the respective LBA in a translation table; and updating a status of validity of the LBA to one of 'valid' and 'invalid' in a metadata table.

In some embodiments, setting a write pointer to point to a WU having a logical address space may include:
  allocating a logical address space including a plurality of logical blocks, wherein each logical block refers to a physical data block of the NVM storage media; and
  dividing the allocated logical address space into a plurality of WUs, wherein each WU has a fixed-sized portion of the allocated logical address space, and wherein each WU represents a fixed-sized portion of a plurality of data-pages on the NVM storage media.

In some embodiments, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

Embodiments may further include:
setting a garbage collection (GC) pointer to point to a WU of the allocated logical address space that is located ahead of the WU pointed by the write pointer;
performing GC on the WU pointed by the GC pointer; and
updating the GC pointer to point to a next WU.

In some embodiments, the GC pointer may be a cyclic pointer, and updating the GC pointer may include incrementing the GC pointer value sequentially, to point to a next WU, from the first WU of the allocated logical address space to the last WU of the allocated logical address space and wrap around back to the first WU of the allocated logical address space.

Performing garbage collection on the WU pointed by the cyclic GC pointer may include:
  reading valid content of at least one page in the WU pointed by the GC pointer;
  marking the at least one page in the WU pointed by the GC pointer as invalid;
  writing the content into at least one page in the WU pointed by the write pointer; and
  marking the at least one page in the WU pointed by the write pointer as valid.

Embodiments may further include:
receiving at least one value of at least one parameter including, for example: a size of data objects, a frequency of data-write requests, a size of WUs and required write amplification (WA) value; and
incrementing the cyclic GC pointer according to the value of the cyclic write pointer and according to the at least one received value.

Embodiments may further include:
analyzing the data in the metadata table, to obtain a parameter of occupancy for each WU;
marking WUs in which the occupancy is above a predefined occupancy threshold as occupied;
if the GC pointer points to a non-occupied WU, then performing GC and incrementing the GC pointer to the next WU;
if the GC pointer points to an occupied WU, then incrementing the GC pointer without performing GC on the occupied WU;
if the write pointer points to a non-occupied WU, then mapping UBA of received data objects to at least one LBA within the WU until the WU is full, and then incrementing the write pointer to the next WU; and
if the write pointer points to an occupied WU, then incrementing the write pointer to the next WU, without mapping UBA of received data objects to the occupied WU.

Embodiments may further include:
receiving a percentage of WUs, that are to be kept for over-provisioning;
marking at least one WU as reserved for over-provisioning, according to the predefined percentage;
if the GC pointer points to a non-reserved WU, then performing GC and incrementing the GC pointer to the next WU;
if the GC pointer points to a reserved WU, then incrementing the GC pointer, to point to the next WU without performing GC on the reserved WU;
if the write pointer points to a non-reserved WU, then mapping UBA of received data objects to at least one LBA within the WU until the WU is full, and then incrementing the write pointer to the next WU; and if the write pointer points to a reserved WU, then incrementing the write pointer to point to the next WU without mapping UBA of received data objects to the occupied WU, to increase the over-provisioning of the NVM media.

Embodiments may further include:

receiving a required level of WA;

analyzing the data in the metadata table, to obtain a parameter of occupancy for each WU;

marking, by the processor, WUs in which the occupancy may be above a predefined occupancy threshold as occupied;

determining the actual WA according to at least one of: the number of occupied WUs, the number of reserved WUs, and a distance between the write pointer and the GC pointer; and dynamically adjusting the percentage of WUs, that are to be reserved for over-provisioning, to adjust the over-provisioning of the NVM media, and to accommodate the required level of WA.

Embodiments may further provide a system for managing (NVM) computer storage media including at least one NVM storage device. Embodiments may include a non-transitory computer memory device upon which modules of computer instruction code are stored and a processor associated with the non-transitory computer memory device and configured to execute the modules of computer instruction code. The processor may be configured, upon execution of the computer instruction code, to:

a. set a write pointer to point to a write unit (WU) having a logical address space;

b. receive at least one data object, having or being described by a user block address (UBA);

c. map the UBA to a logical block address (LBA) within the write unit (WU) pointed by the write pointer;

d. repeat steps b and c until the address space of the WU is full;

e. store the content of the WU in at least one physical block address (PBA)

f. update the write pointer to point to a next WU; and g. repeat steps b thru f with the next WU.

Embodiments may further provide a method of managing NVM computer storage media including at least one NVM storage device, by at least one processor.

Embodiments of the method may include:

causing a first pointer to reference a WU having a logical address space;

receiving a data object having or being described by a UBA, mapping the UBA to an LBA within the WU referenced by the pointer, and repeating the receiving and mapping operations until the address space of the WU is filled;

saving the data in the WU in at least one PBA of the NVM media;

updating the pointer to point to a next WU; and performing the receiving and mapping repetition, and the saving operation for a subsequent WU.

Embodiments of the present invention may provide a method and a system for evicting or purging expired or stored data objects or elements from an NVM-based cache memory device.

As elaborated herein, embodiments may rely on utilizing a garbage-collection (GC) mechanism for purging the expired data, without employing a data crawling mechanism, so as to avoid additional read amplification, write amplification and/or overhead network traffic.

As elaborated herein, embodiments may receive at least one data object for storage on the cache memory device and may also receive or compute a time to live (TTL) value associated with the received data object. For example, in a condition where a user or an application may access a storage system to store the data object according to a key/value storage scheme as known in the art, the TTL metadata value may be included within the data object's key metadata, and embodiments may receive the TTL value therefrom.

As elaborated herein, embodiments may store the TTL value adjacent to or in conjunction with the respective or associated data object on the NVM storage media (e.g., the NVM cache memory device) at one or more PBAs represented by one or more LBAs of the logic address space. The GC mechanism may be adapted to deduce whether a cached data object is valid or not based on monitoring of user and/or application data access operations (e.g., write access operations, data update operations, etc.). The GC mechanism may also read and or parse the stored TTL metadata and determine whether the cached data element has expired based on the stored, respective TTL metadata value associated with the object. For example, if the TTL represents an already elapsed real-world time (e.g., an elapsed coordinated universal time (UTC)), the GC mechanism may deduce that the cached data object has expired and is currently stale. The GC mechanism may subsequently automatically evict, delete or purge one or more data objects that have been determined as expired. In some embodiments, storage space may be freed by a background process, to enable storage of new, valid data objects therein.

Embodiments of the present invention may include a system and a method of managing storage of cached data objects on a non-volatile memory (NVM) computer storage media, that may include at least one NVM storage device, by at least one processor.

Embodiments of the present invention may include:

receiving one or more data objects having respective Time to Live (TTL) values;

storing the one or more data objects and respective TTL values at one or more physical block addresses (PBAs) of the storage media; and performing a garbage collection (GC) process on one or more PBAs of the storage media based on at least one TTL value stored at a PBA of the storage media.

As elaborated herein, the GC process may include:

reading the content of the one or more PBAs;

parsing the read data to extract one or more TTL values of respective one or more data objects stored in the one or more PBAs;

determining a status of expiration of storage of one or more data objects, as one of expired and non-expired, based on the respective extracted TTL values; and managing storage of the received one or more data objects on PBAs of the storage media, based on the determined status of expiration.

As elaborated herein, one or more data objects may be received from a remote computing device via a communication network (e.g., over a communication network such as the internet) and the GC process may be performed locally (e.g., over a Peripheral Component Interconnect Express bus (PCIE)) by the at least one processor on the at least one NVM storage device.

Embodiments of the present invention may include:
monitoring data-write operations of data objects on the NVM storage media; and
maintaining a metadata table that may associate between one or more PBA addresses and a respective status of validity of storage of data objects thereat.

The status of validity may be for example, one of valid and invalid, based on the monitored write operations and the at least one processor may be further configured to manage the storage of the received one or more data objects on PBAs of the storage media based on the status of validity.

The PBAs of the storage media may be represented by respective logical block addresses (LBAs) in a logical address space, and the LBAs may be organized in write units (WUs), where each WU may include one or more LBAs.

The GC process may include:
a. setting a GC pointer to point to a first WU of the logical address space;
b. reading content of valid, non-expired data from one or more PBAs that are represented by the first WU;
c. writing the read content to one or more PBAs represented by a second WU of the logical address space; and
d. updating the GC pointer value sequentially, to point to a subsequent WU in the logical address space.

As elaborated herein, steps b, c and d may be repeated and the GC pointer may be advanced or updated in a cyclical order, over a subset of WUs of the logical address space.

Embodiments may write the read content by:
setting a write pointer to point to the second WU of the logical address space;
writing the read content to one or more PBAs represented by the second WU; and
updating the write pointer in a cyclical order, over the subset of WUs of the logical address space.

According to some embodiments, the PBA represented by the first WU may be marked as empty. Subsequently, embodiments may manage storage of received one or more data objects on PBAs of the storage media 30 by erasing empty PBAs (e.g., by employing a background erasure process), as known in the art.

According to some embodiments, one or more received data objects may be described by a user block address (UBA). The one or more received data objects and one or more respective TTL values may be stored by:
mapping the UBA to one or more LBAs; and
storing the data object and respective TTL value on the NVM storage media at the one or more PBAs represented by the one or more LBAs.

Embodiments of the present invention may include a system for managing storage of cached data objects on a non-volatile memory (NVM) computer storage media, include at least one NVM storage device.

Embodiments of the system may include a non-transitory memory device, where modules of instruction code are stored and at least one processor associated with the memory device, and configured to execute the modules of instruction code. Upon execution of the modules of instruction code, the at least one processor may be further configured to perform at least one of:
receive one or more data objects having respective TTL values;
store the one or more data objects and respective TTL values at one or more PBAs of the storage media; and
perform a GC process on one or more PBAs of the storage media based on at least one TTL value stored at a PBA of the storage media.

The at least one processor may be configured to perform the GC process by:
reading the content of the one or more PBAs;
parsing the read data to extract one or more TTL values of respective one or more data objects stored in the one or more PBAs;
determining a status of expiration of storage of one or more data objects, as one of expired and non-expired, based on the respective extracted TTL values; and
managing storage of the received one or more data objects on PBAs of the storage media, based on the determined status of expiration.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3B is a block diagram depicting a system for optimizing WA of NVM storage media, according to some embodiments;

Figure 1:
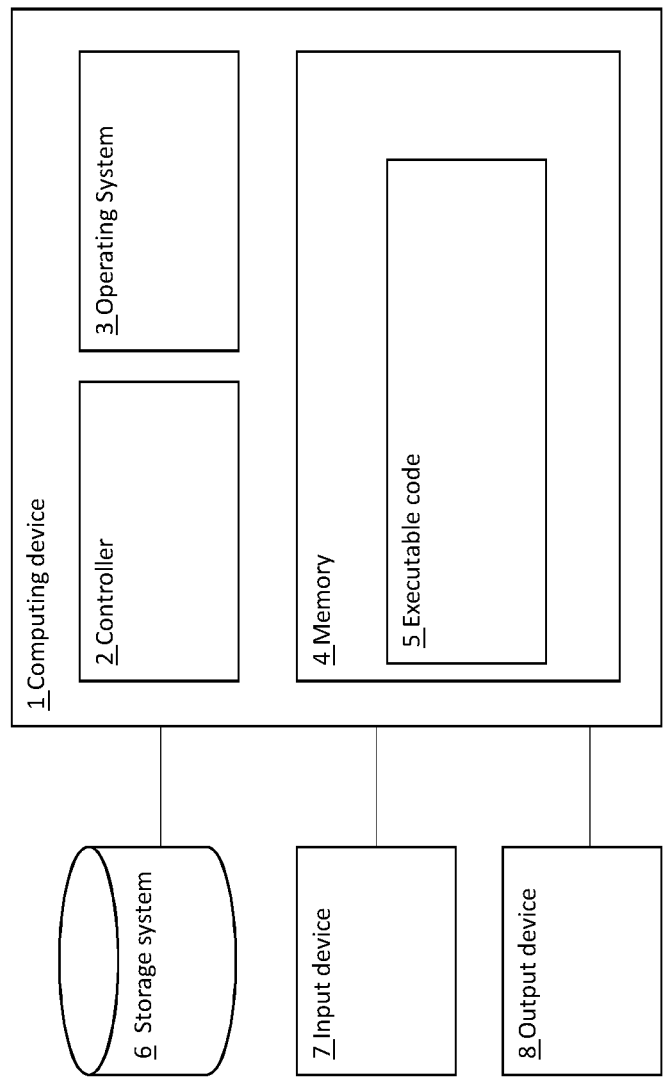
FIG. 1 is a block diagram depicting a computing device, which may be included within a system for managing non-volatile memory (NVM) computer storage media, according to some embodiments.

It will be appreciated that for simplicity and clarity of illustration, elements shown in the figures have not necessarily been drawn to scale. For example, the dimensions of some of the elements may be exaggerated relative to other

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for providing a single point of control to NVM storage media that may include one or more NVM storage devices. Embodiments may be configured to optimize the write amplification (WA) metric and enhance the NVM storage devices' life-expectancy by cancelling non-cooperative address translations and garbage collection (GC) processes, that may be performed concurrently by applications running on host computers, and by at least one controller of the at least one NVM storage device.

An embodiment may be configured to write data objects onto the NVM media into complete data blocks, and in a sequential, cyclic pattern. When the same data objects are later re-written to the NVM media, complete data blocks become invalid, page after page, in that same order.

From the NVM controller's point-of view, this write pattern may ensure that there would never be valid data objects that are "scattered" in the NVM's physical address space, and need to be copied elsewhere, nor would there be data blocks that need to be aggregated from a plurality of pages of other blocks within the NVM storage media's physical address space. This condition may effectively cancel the operation of the internal NVM controller's GC process, reducing it to merely erasing completely-invalidated blocks, to enable future write access thereto.

Reference is now made to FIG. 1, which is a block diagram depicting a computing device, which may be included within an embodiment of a system for managing NVM computer storage, according to some embodiments.

Computing device 1 may include a controller 2 that may be, for example, a central processing unit processor (CPU), a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that enforces security in a vehicle as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The term "NVM device" is used herein to refer to a single device, such as a flash storage device and a solid-state storage device (SSD) or the like, that may, or may not be managed by an NVM controller. The term "NVM media" 30 is used herein to refer to one or more NVM devices, that may be managed by a single NVM controller 310 or not managed by an NVM controller 310 or managed by a plurality of NVM controllers 310.

Figure 2:
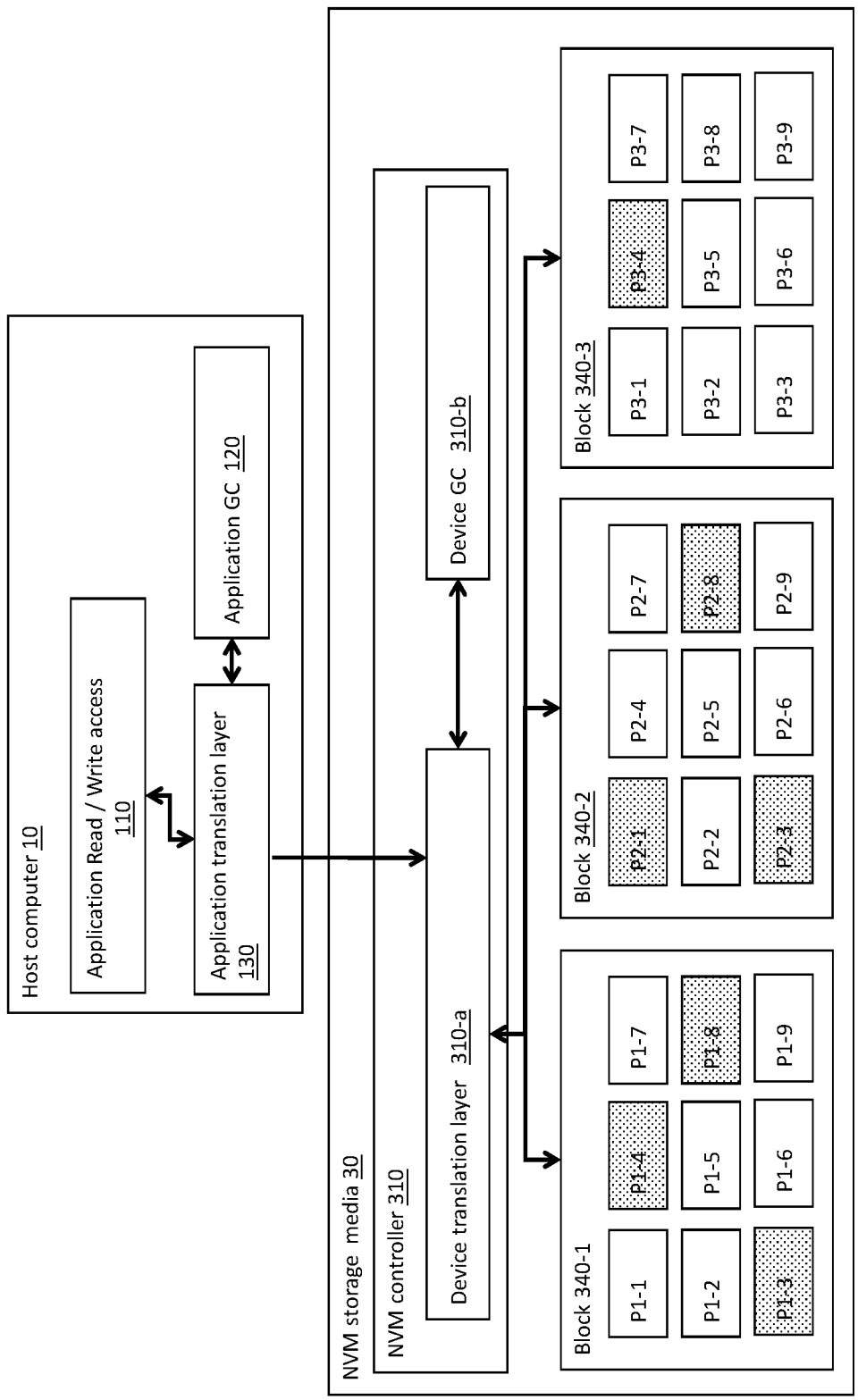
FIG. 2 is a simplified block diagram, depicting a host computer's write operation, in absence of a system for managing NVM storage media.

Reference is now made to FIG. 2, which depicts a simplified block diagram, depicting a host computer's write operation, in the absence of the system for managing and optimizing write amplification (WA) of NVM storage media.

According to some embodiments, host computer 10 may be implemented as a computational device (e.g. element 1 of FIG. 1) and may be running or executing an application 110 that may require storing a data object on NVM storage media 30. Application 110 may be required to work in a virtual application address space, including a plurality of fixed-sized user data blocks.

If the data object is not aligned to the size of the user data blocks, an application translation layer 130 will be required to translate the data object's address to a specific user block address (UBA), and an application-level GC mechanism 120 will be required to retrieve invalid user blocks.

The UBA address may be propagated to NVM storage media 30, to a controller 310, where it may be translated again in an inherent device translation layer 310-*a*, to obtain an addressable, physical location on the NVM media (e.g. page 1-4 on data block 340-1).

NVM controller also employs its own, inherent GC module 310-*b*, which may be oblivious to application GC 120, hence causing duplication of GC write operations on an NVM storage device of NVM storage media 30.

Figure 3A:
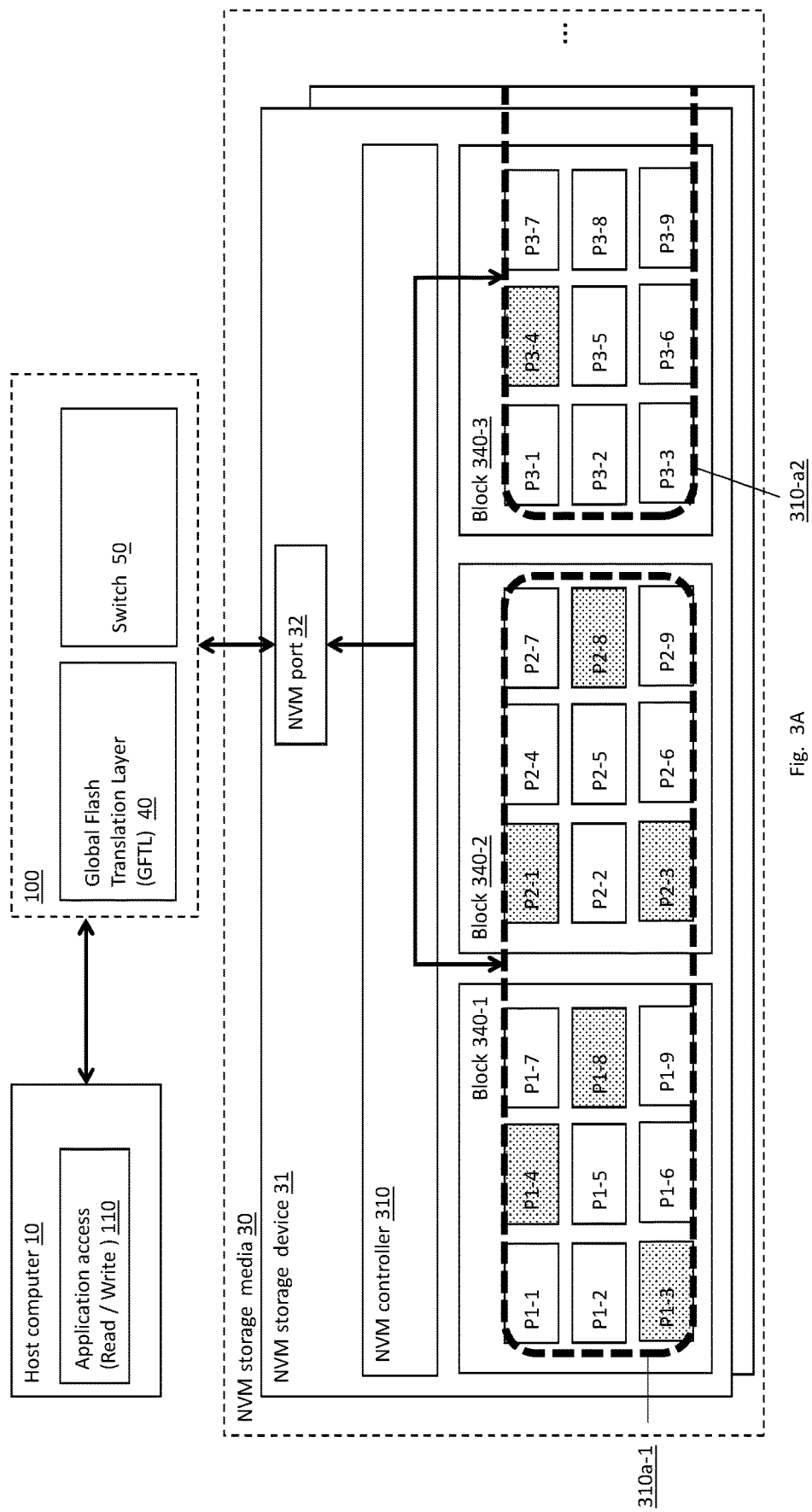
FIG. 3A is a block diagram depicting a system for optimizing WA of NVM storage media, according to some embodiments.

Reference is now made to FIG. 3A and FIG. 3B, which are block diagrams depicting examples of embodiments of a system 100 for managing storage and optimizing WA on one or more NVM storage media 30, according to some embodiments.

Embodiments may manage data storage on NVM media 30 including one or more NVM devices 31 by (a) controlling a mapping of data objects having or being described by virtual UBA addresses from an application address space to logical LBA addresses on a logical address space, and (b) sending the data objects referred by the LBA addresses to the one or more NVM storage device for storage, as explained herein.

Embodiments may include a global flash translation layer (GFTL) 40, which may be implemented as a computational device (e.g. element 1 of FIG. 1). GFTL 40 may be communicatively connected to host computer 10 and associated with at least one NVM storage device 31. For example, GFTL 40 may be connected to host computer 10 via a computer network (e.g. Internet) and attached to NVM 30 through a Peripheral Component Interconnect Express (PCIE) bus.

In another example, NVM media 30 may include one or more NVM devices 31 (e.g., one or more SSD devices) and GFTL 40 may be connected to the one or more (e.g., a plurality) of NVM devices through a port switch 50. Port switch 50 may be configured to route data between an embodiment of system 100 and at least one port 32 of at least one NVM device 31 of the plurality of NVM devices.

Figure 4:
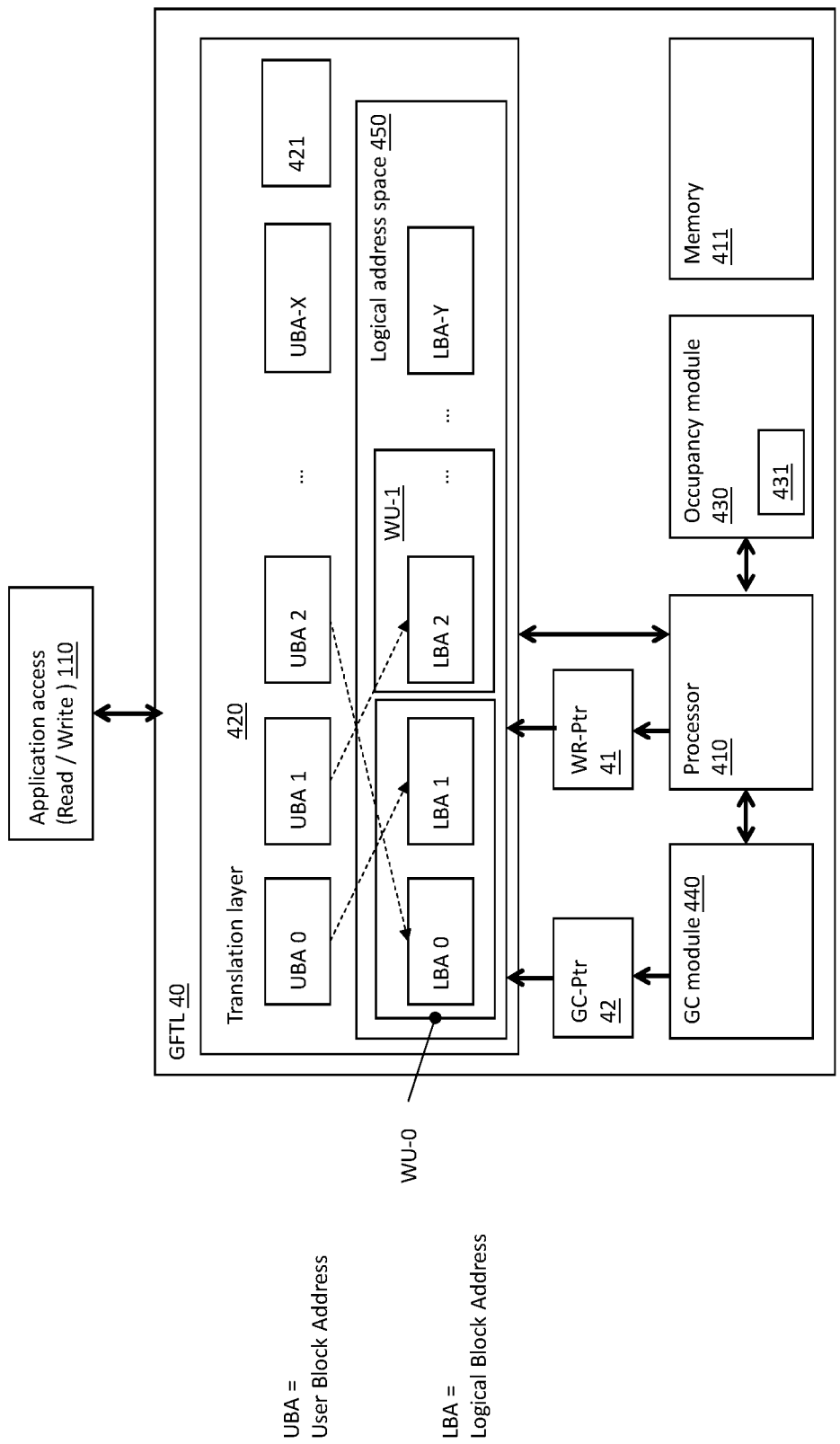
FIG. 4 is a block diagram depicting the content of the Global Flash Translation Layer (GFTL), which may be part of a system for managing NVM storage media, according to some embodiments.

GFTL 40 may include a logical address space, including a plurality of logical blocks, which may refer to physical data blocks of the NVM storage media (e.g. 340-1, 340-2, 340-3), as explained in relation to FIG. 4, herein.

The logical address space may be divided into a plurality of write units (WUs), as explained further below. Each WU may represent a fixed-sized portion of contiguous pages of the NVM storage media (e.g.: 310-*a*1, 310-*a*2).

In some embodiments, at least one WU may represent a portion of the NVM media (e.g.: 310-*a*1) that may span across one or more NVM devices 31.

GFTL 40 may be configured to provide a single point of control for managing the address translation and GC processes between application 110, running on host computer 10, and the NVM storage media 30, as explained further below.

GFTL 40 may cause a first pointer to reference a WU, having a logical address space. GFTL may then receive a data object, having or being described by a UBA and map the UBA to an LBA within the WU referenced by the pointer. This operation of receiving data objects and mapping of the UBA address to an LBA address may be repeated until the address space of the WU is filled, e.g. until there is no more space in the WU for an additional received data object.

GFTL 40 may save the data content of the filled WU in at least one PBA of the NVM media, and may continue the operation of receiving data objects, mapping them and storing them as long as at least one application 110 on host computer 10 requires access to NVM storage media 30.

As shown in FIG. 3A, each WU may represent a plurality of physical data blocks of NVM media 30, that may span over one or more NVM devices 31. For example, data blocks 340-1 and 340-2 may reside on the same NVM storage device 31 and a first WU may represent a combined address space 310a-1 of physical data blocks 340-1 and 340-2.

According to some embodiments, NVM storage media 30 may include a plurality of NVM storage devices 31 (e.g., multiple flash devices), and at least one WU may be configured to represent an address space that spans over one or more NVM storage devices 31. For example, data blocks 340-1 and 340-2 may reside on separate NVM storage devices 31 and the first WU may represent a combined address space 310a-1 of physical data blocks 340-1 and 340-2 of the separate NVM devices 31.

Alternately, as shown in FIG. 3B, each WU may represent a contiguous address space, including a plurality of data pages from one or more physical data blocks 340. For example, a second WU may represent the combined address space of pages P1-7, P1-8 and P1-9 of physical data block 340-1 and pages P2-1, P2-2 and P2-3 of physical data block 340-2.

In some embodiments, all WUs of the logical address space may be allocated the same size. This size may be determined according to a variety of parameters, including for example: data storage rate, size of data objects, frequency of data access, the number of NVM devices 31 included in NVM media 30, required WA, etc. The parameters may be stored on a memory device (e.g. element 4 of FIG. 1, element 411 of FIG. 4) or on a header of NVM media 30.

Reference is now made to FIG. 4 is, which is a block diagram depicting the example content of the Global Flash Translation Layer 40 (GFTL), which may be part of the system for optimizing WA of NVM storage media, according to some embodiments. GFTL 40 may include a non-transitory computer memory device 411 in which modules of computer instruction code are stored, and a processor 410 associated with the non-transitory computer memory device 411 and configured to execute the modules of computer instruction code, to implement embodiments of the present invention.

Processor 410 may be configured to allocate a logical address space 450, that may include a plurality of logical blocks (LBA0 thru LBA-Y), wherein each logical block refers to a physical data block of the NVM storage media, as explained below in relation to FIG. 5A and FIG. 5B. The term 'allocation' is used herein to refer to a process by which memory space (e.g. of element 4 of FIG. 1) is dedicated or reserved, e.g. by processor 410, to the purpose of mapping at least one data object having or being described by or referred by a UBA to an LBA.

Processor 410 may divide the allocated logical address space into a plurality of WUs (e.g. WU-0), wherein each WU has a fixed-sized portion of the allocated logical address space, as explained below in reference to FIG. 5A and FIG. 5B. Each WU of the plurality of WUs may represent a fixed-sized portion of a plurality of data-pages on the NVM storage media, as also explained below in reference to FIG. 5A and FIG. 5B.

Additionally, or alternatively, GFTL 40 may be configured to manage storage of data on non-volatile storage media 30 that may be or may include a plurality, or a pool of non-volatile memory devices (e.g., elements 31 of FIG. 3B). In such embodiments, one or more WUs may represent a physical storage space that may be contiguous or non-contiguous and may even span over more than one physical, NVM storage device 31.

For example, each WU (e.g., WU-0, WU-1) may include a plurality of logic blocks, having respective logic block addresses (LBAs, e.g., LBA0, LBA1, etc.) and representing a contiguous portion of logical address space 450. Each LBA may represent a respective physical storage block (e.g., on an NVM storage device 31). The ordering of LBAs may or may not correspond to the ordering of their respective physical block addresses, such that a content of a portion of a WU (e.g., data stored at LBAs included therein) may or may not be stored sequentially on one or more memory devices 340 included in NVM storage media 30.

Processor 410 may be configured to define a cyclic write pointer 41 and set it to point or refer to a WU of the logical address space. Processor 410 may be further configured to define a cyclic GC pointer 42 and set it to point or refer to another WU of the logical address space, different from the WU pointed by write pointer 41.

Write pointer 41 and GC pointer 42 may be cyclic, in the sense that processor 410 may be configured to increment the value of these pointers in a sequential, cyclic pattern, from the first WU of the allocated logical address space 450 to the last WU of the allocated logical address space 450 and, after the last WU, on incrementing, wrap around back to the first WU of the logic address space (e.g., repeat the values of the WU address space).

Processor 410 may locate the GC pointer ahead of the write pointer, to perform garbage collection on the WU pointed by the GC pointer, and thus prepare WUs for write pointer 41, as explained herein. The term 'ahead' in this context relates to the GC pointer referring to a WU that has an address value that is higher than the address value of the write pointer, or a WU that precedes the WU in the order of pointer incrementation, as elaborated below in relation to FIGS. 6a, 6B and 6C.

For example, write pointer 41 may point to a first address (e.g. 0x10) in logical address space 450, and GC pointer 42 may point to a second address (e.g. 0x20) in logical address space 450. The pointers may be incremented (e.g. 0x11 and 0x21 respectively), keeping GC pointer 42 ahead of write pointer 41 in the direction of pointer incrementation. When the pointers reach the end of the logical address space 450 (e.g. NW, they may be incremented cyclically, back to the beginning of logical address space 450 (e.g. 0x00), keeping GC pointer 42 ahead of write pointer 41 in the direction of pointer incrementation.

According to some embodiments, GFTL 40 may include a translation layer 420, for mapping (e.g., translating) user block addresses (UBAs) to logic block addresses (LBAs) within the logical address space 450. For example, translation layer 420 may take as input a UBA (e.g. an address of a data object received from application 110) and produce as output an LBA. Embodiments of translation layer 420 may be implemented as a translation table 421, associating UBAs with respective LBAs, as shown in the example of FIG. 4 by dashed arrows.

Processor 410 may receive at least one data object having a UBA in the virtual, application address space, to be stored on the NVM storage media. Processor 410 may map or translate the UBA of the data object to an LBA of a logical block within the WU pointed by the cyclic write pointer. For example, as shown in FIG. 4 data stored on UBA 0 may be mapped to LBA 1. Processor 410 may be configured to continuously or repeatedly update the mapping or correspondence between the virtual address of received data objects (e.g. UBA-0, UBA-1, etc.) in the application address space, and their respective addresses in the logical address space (e.g. LBA-0, LBA-1, etc.) in translation layer 420.

According to some embodiments, GFTL 40 may continue to map or translate at least one UBA of a data object to an LBA of a logical block, as long as data objects are received from host 10, or at least as long as data objects need to be garbage-collected. This may be seen as analogous to a perpetual operation of an operating system, that is executed as long as the computing device it resides on is active.

For example, GFTL 40 may receive a UBA address which includes a combination of a namespace address (e.g. an address of a virtual hard drive) and an offset from the namespace address, as known to persons skilled in the art. GFTL 40 may map the UBA address to an LBA address that includes the address of the WU pointed by the write pointer and an offset to a logical data block within that WU. GFTL 40 may pass or send the data object mapped to the LBA address to an NVM storage media (e.g. element 30 of FIG. 2) for storage.

Following the mapping or translation of received data blocks to LBAs, NVM storage media 30 may store the received data objects into physical data blocks of the NVM storage media, having physical block addresses (PBAs). In some embodiments, storage of the data block on NVM storage media may be managed by an NVM media controller (e.g. element 310 of FIG. 2), as known to persons skilled in the art of computer storage.

It is important to note that although GFTL 40 may not directly control the location (e.g. the PBA) of stored data objects on NVM media 30 (that may be controlled by an inherent NVM media controller 310), the order at which data objects are mapped to LBAs of the logical address space may directly affect linearity of data storage on NVM media 30, and the consequent write amplification (WA) of NVM media 30 during its operation, as explained herein.

Data objects may continuously be received (e.g. from application 110 of FIG. 3A) by processor 410. The data objects may be mapped to LBAs and appended or added to the WU pointed by the write pointer, until the address space of the WU pointed by the cyclic write pointer is full.

For example, each WU may include a continuous range of LBAs, e.g.: WU 0 may include LBA 0 to LBA 7, WU 1 may include LBA 8 to LBA 15, etc. A first UBA (e.g. UBA X) may be mapped into a first LBA (e.g. LBA 'Y') within a first WU (e.g. WU 'Z'). This mapping may include writing the content of the first UBA into the address space of the first LBA, and updating translation table 421 of translation layer 420, to translate between the address of the first UBA (e.g. UBA X) and the address of the first LBA (e.g. LBA 'Y'). The mapping of UBAs to LBAs in the first WU (e.g. WU 'Z') may continue until the first WU is full, e.g. when there is no room in the WU to include an additional data object by mapping an additional UBA to an LBA therein.

Processor 410 may write the content of the first WU (e.g. WU 'Z') to an address space of physical data blocks (e.g. element 310-*a*1 of FIG. 3A) represented by the first WU, that may include one or more physical address blocks, as explained above in relation to FIGS. 3A and 3B.

Processor 410 may update write pointer 41, to point to a next WU (e.g. WU 'Z+1') of the logical address space 450, e.g. the immediately subsequent WU within the logical address space 450, and repeat the process of receiving data objects, mapping them to LBAs and storing them on NVM 30 with the next WU.

For example, processor 410 may increment the value of the write pointer in a sequential, cyclic order, to refer to an adjacent WU of the logical address space 450.

According to some embodiments, GFTL 40 may include a GC module 440, associated with processor 410, and implemented as a hardware module, a software module or any combination thereof. For example, GC module 440 may be implemented as a software process and may be executed by processor 410. In another example, GC module 440 may be implemented as a computational device (e.g. element 1 of FIG. 1) and may be communicatively connected to processor 410.

GC module 440 may be configured to receive GC commands from processor 410. GC module may perform garbage collection on a WU pointed by the GC pointer 42 and may modify the value of the GC pointer to point to a specific WU of the logic address space 450 according to the received commands.

For example, processor 410 may command GC module to: set the GC pointer 42 value to point to a WU of the allocated logical address space that is ahead of the WU pointed by the write pointer; perform GC on the WU pointed by the GC pointer; and update the GC pointer value to point to a next or immediately subsequent WU (e.g. in a sequential, cyclic order, as explained above).

According to some embodiments, GFTL 40 may include an occupancy module 430, associated with processor 410, and implemented as a hardware module, a software module or any combination thereof. For example, occupancy module 430 may be implemented as a software process and may be executed by processor 410. In another example, occupancy module 430 may be implemented as a computational device (e.g. element 1 of FIG. 1) and may be communicatively connected to processor 410.

Occupancy module 430 may be configured to continuously monitor mapping of data objects to LBAs, and garbage collection from LBAs within, and maintain (e.g., on a metadata table such as element 431) at least one of:
an updated status of validity of each data page within each LBA; and
an updated status of occupancy for each WU.

According to some embodiments, occupancy module 430 may be associated with processor 410 and may perform these actions according to commands received from processor 410.

For example, during a GC process, valid data pages may be moved from a first LBA (e.g. LBA-1), pointed by GC pointer 42 to a second LBA (e.g.: LBA-2), pointed by write pointer 41. Occupancy module 430 may consequently: (a) mark read pages within LBA-1 as invalid (e.g., in table 431); (b) mark written pages within LBA-2 as valid (e.g., in table 431); (c) calculate the occupancy of the WUs pointed by write pointer 41 and GC pointer 42 as the percentage of valid pages from the total number of addressable pages within the respective WUs; and (d) maintain an updated level of occupancy per each WU in metadata table 431.

According to some embodiments, metadata table 431 may be implemented in the same table as translation table 421. In alternate embodiments, metadata table 431 and translation table 421 may be implemented as separate instances.

Processor 410 may be configured to perform garbage collection on the WU pointed to by the cyclic GC pointer, to "clear the way" and prepare WUs for the write pointer and increment the cyclic GC pointer according to the value of the cyclic write pointer.

According to some embodiments, the process of GC performed by GC module 440 may include at least one of: (a) reading content of at least one valid data page in the WU pointed by the GC pointer; (b) marking the at least one page in the WU pointed by the GC pointer as invalid; (c) writing the content into at least one page in the WU pointed by the write pointer; and (d) marking the at least one page in the WU pointed by the write pointer as valid.

The GC process described may prevent the NVM storage media controller 310 from performing GC on physical data blocks that are associated with the WU pointed by the cyclic GC pointer, because it may retrieve all valid data pages from the WU pointed by the GC and aggregate them in the WU pointed by the cyclic write pointer, and therefore may render an inherent GC of the NVM controller 310 redundant.

Figure 5A:
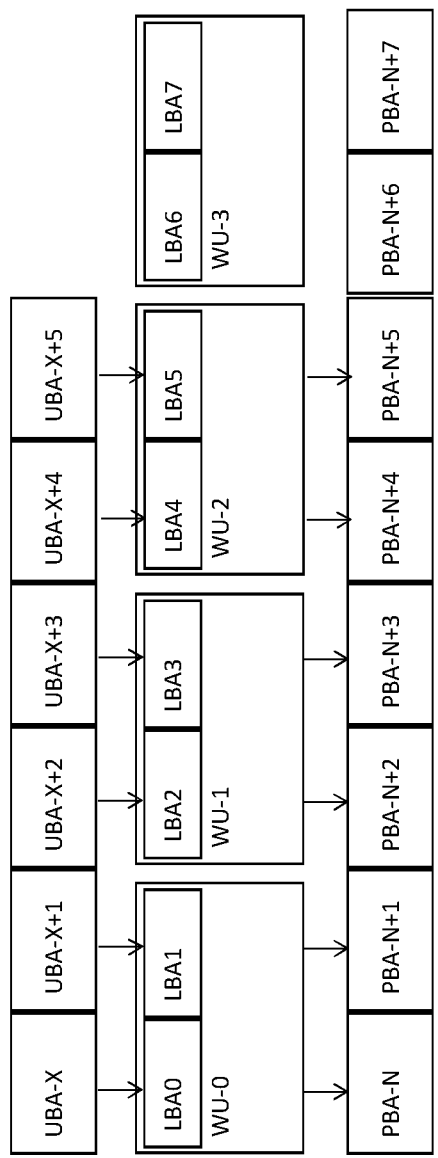
FIGS. 5A and 5B are schematic diagrams, depicting example of the operation of the GFTL garbage collection module, which may be part of a system for managing NVM storage media, according to some embodiments.
Figure 5B:
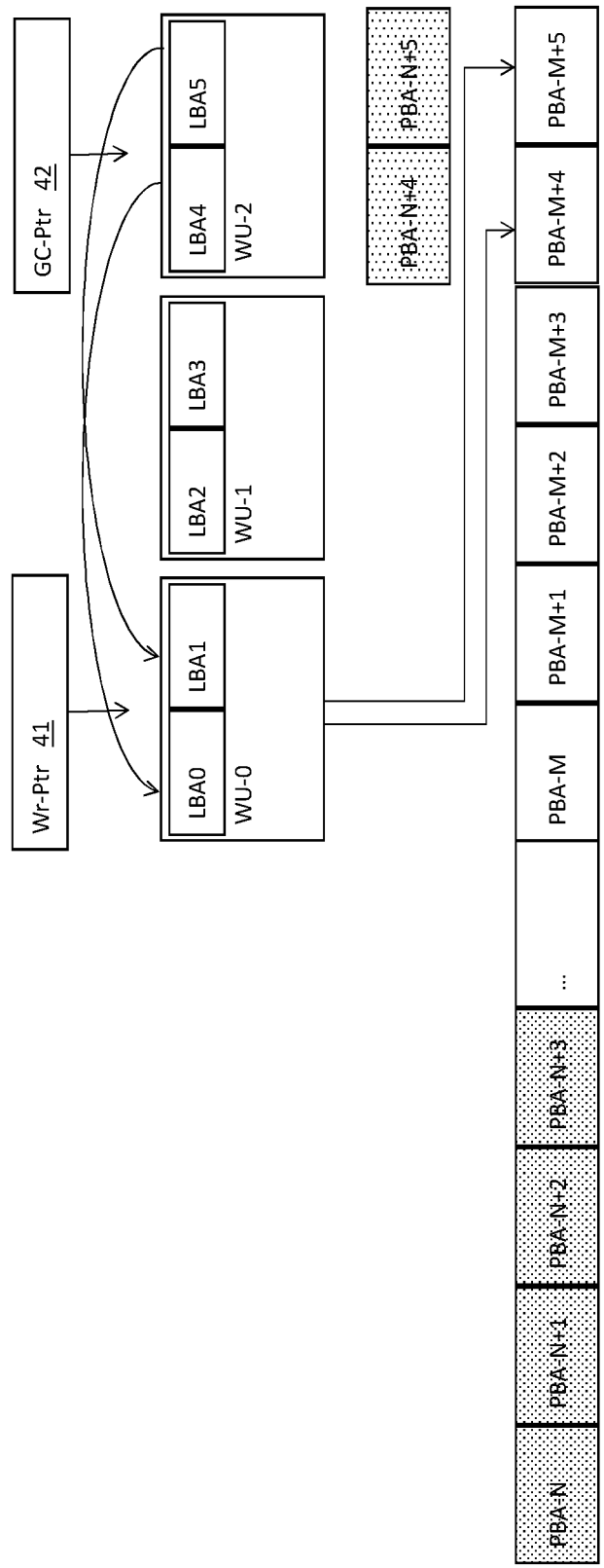

Reference is now made to FIGS. 5A and 5B, which are schematic diagrams, depicting an example of the operation of GFTL 40 and GC module 440, which may be part of the system for optimizing WA of NVM storage media, according to some embodiments.

FIG. 5A shows an exemplary condition of an embodiment, prior to applying GC by GC-module 400. A processor (e.g. element 410 of FIG. 4) may have received a plurality of data objects, pertaining to UBA X thru UBA X+5, and may have mapped them sequentially to LBA 0 thru LBA 5, that are included within WUs WU-0 thru WU-2 respectively. WU-0 thru WU-2 may have been filled to a point that additional data objects may not have been mapped thereto and may consequently be referred to as 'full' WUs.

It is important to note that as the mapping of data objects to LBAs may have been done sequentially, according to the location of the cyclic write pointer (e.g. element 41 of FIG. 4) as explained above, NVM controller (e.g. element 310 of FIG. 2) may have consequently stored the received data objects sequentially, to physical data blocks PBA-N thru PBA N+5.

FIG. 5B shows an exemplary condition of an embodiment during application of GC by GC module 440. As shown in FIG. 5B, GC pointer 42 may have gone through WU-0 and WU-1 and may now be pointing to WU-2. Write pointer 41 may have gone through previous WUs (not shown) and may now be pointing to WU-0. According to some embodiments, GC pointer may always point to a WU that is advanced in relation to the write pointer, in the direction of the WU's direction of incrementation, to prepare WUs to be written by the write pointer.

As shown in FIG. 5B, data objects that may have previously been mapped to full WU-0 and WU-1 may have been mapped elsewhere (not shown), and respective data objects that have resided in physical data blocks PBA-N thru PBA N+3 may have already been collected therefrom and written sequentially to PBA-M thru PBA M+3. During this process, NVM controller may only have needed to write the content of full WUs WU-0 and WU-1 to physical data blocks PBA-M thru PBA M+3 and may not have needed to check the validity of data pages PBA-N thru PBA N+3 or perform GC thereupon, thus rendering an inherent GC process as redundant. NVM controller 310 may now only erase PBA-N thru PBA N+3, and thus prepare them for writing.

According to some embodiments, the sequential order of written data objects on physical data blocks (e.g.: movement from sequential locations PBA-N thru PBA N+3 to PBA-M thru PBA M+3) may be maintained by the NVM controller, because physical data blocks are invalidated and erased by GC module 440 in the same sequential order in which they have been written by GFTL 40. As a result, the linearity of stored sequential data that may have been received from a host computer (e.g. element 10 of FIG. 2) by processor 410 may be maintained throughout data deletion and modification and may not be corrupted by an inherent GC process.

As further shown in FIG. 5B, data objects that may have been mapped to LBA4 and LBA5, within WU-2, which may be pointed by GC pointer 42, may be remapped to freed WU-0, which may be pointed by write pointer 41. Physical data blocks PBA N+4 and PBA N+5 may be about to be invalidated, and NVM controller 310 may be about to write the new content of now re-filled WU-0 in sequential order to physical data blocks PBA M+4 and PBA M+5.

As discussed above, in relation to FIG. 4, processor 410 may be configured to control occupancy module 430, to analyze data relating to the validity of pages, as stored in metadata table 431, and obtain a parameter of occupancy for each WU.

Processor 410 may receive (e.g. via a user interface, from the non-transitory memory device and the like) at least one parameter and may increment the cyclic GC pointer according to at least one of: the value of the cyclic write pointer, the at least one parameter and the occupancy of at least one WU.

For example: processor 410 may receive an occupancy threshold parameter (e.g. 90%) and determine whether at least one WU is occupied beyond the occupancy threshold parameter (e.g. the number of valid pages within the WU exceeds 90% of the total number of pages in that WU). Processor 410 may consequently mark the at least one WU in which the occupancy is above a predefined occupancy threshold as 'occupied' in metadata table 431.

Processor 410 may control the GC pointer (e.g. element 42 of FIG. 4), write pointer (e.g. element 41 of FIG. 4) and GC module 440 according to the marked occupancy so:

if GC pointer 42 points to a non-occupied WU, then command GC module 440 to perform GC and increment GC pointer 42 to the next WU (e.g. the immediately subsequent WU within the logical address space 450);

if GC pointer 42 points to an occupied WU, then command GC module 440 to increment GC pointer 42 without performing GC on the occupied WU;

if write pointer 41 points to a non-occupied WU, then map UBA of received data objects to at least one LBA within the WU until the WU is full, and then increment the write pointer to the next WU; and if the write pointer 41 points to an occupied WU, then increment write pointer 41 to the next WU, without mapping UBA of received data objects to the occupied WU.

Experimental results show that skipping occupied WUs may enable GFTL 40 to improve the WA in the presence of 'cold' valid data (e.g. data that remains valid from one write cycle to another in the same physical location and is not copied to another physical location). However, skipping occupied WUs by GFTL 40 may cause some inherent GC activity within the NVM controller (e.g. element 310 of FIG. 2), because it breaks the sequential, cyclic write order. Experiments show that a 'global' write amplification metric may be regarded as a product of WA caused by GFTL 40 and inherent WA, caused by NVM controller 310, as shown in the following equation Eq. 2:

$$\text{Global-WA} = \text{WA-GFTL} \times \text{WA-NVM} \qquad \text{Eq. 2}$$

From GFTL's 40 perspective, WUs that have been skipped may not require GFTL GC read and write operations. This means that some of the write amplification (WA) has been moved from GFTL 40 to NVM controller 310. Even though the entity performing GC read and write operations has changed due to the sequential write order, GC read and write operations have not been duplicated, and hence the global WA has not increased due to skipping occupied WUs. Moreover, according to some embodiments, if the same WUs are skipped from one write-cycle to another, NVM controller 310 may be configured to identify the data as 'cold' and avoid performing GC operations on the respective physical data blocks altogether, thus decreasing the global WA despite skipping occupied WUs.

Figure 6A:
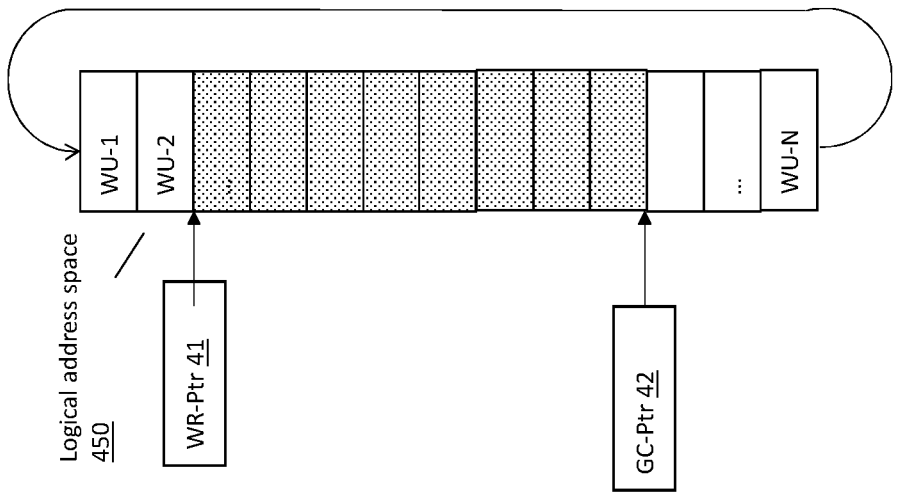
FIG. 6A, 6B, 6C are block diagrams depicting WUs that may be included in the logical address space, and different locations of the write pointer and garbage-collection (GC) pointer, which may be part of a system for managing NVM storage media, according to some embodiments.
Figure 6B:
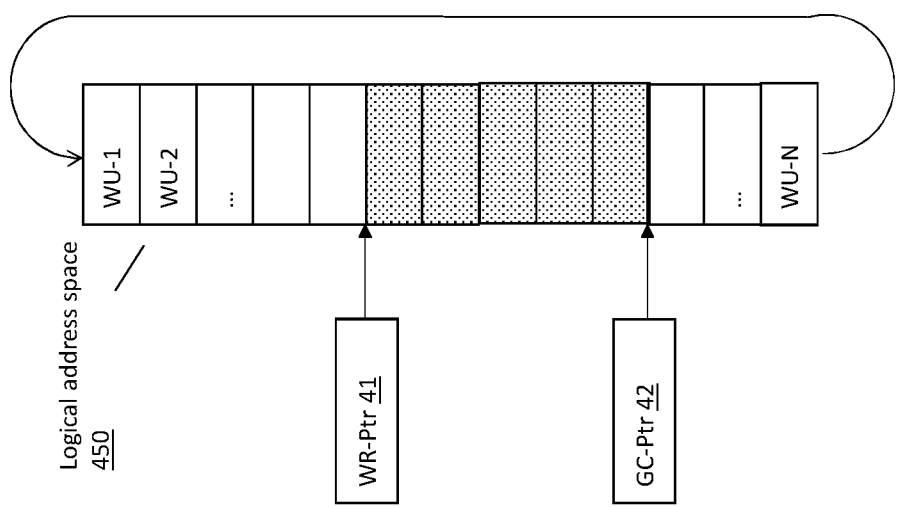
Figure 6C:
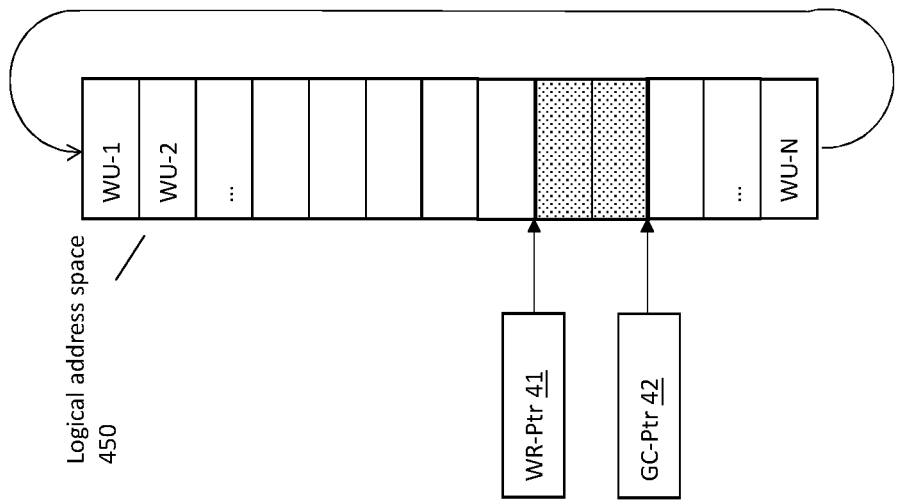

Reference is now made to FIGS. 6A, 6B, and 6C which are block diagrams depicting the WUs included in logical address space 450, and different examples of locations of write pointer 41 and GC pointer 42, according to some embodiments. As shown in FIG. 6A, FIG. 6B and FIG. 6C, GC pointer 42 and write pointer 41 are configured to be incremented sequentially, in a cyclic pattern. Valid data may be copied from a WU pointed by GC pointer 42, to a WU pointed by write pointer 41. The only difference between FIG. 6A, FIG. 6B and FIG. 6C is in the distance between GC pointer 42 and write pointer 41. The term 'distance' as used herein may mean the number of WUs in the gap between GC pointer 42 and write pointer 41.

FIG. 6A depicts a large distance between GC pointer 42 and write pointer 41. This distance may enable a host computer (e.g. element 10 of FIG. 2) to perform multiple write operations to the NVM storage media (e.g.: element 30 of FIG. 2), without need to perform garbage collection.

FIG. 6C depicts a small distance between GC pointer 42 and write pointer 41. This distance may not enable host computer 10 to perform a large number of write operations to NVM storage media 30 without first performing garbage collection on physical data blocks.

FIG. 6B depicts an intermediate distance between GC pointer 42 and write pointer 41. This distance may enable host computer 10 to perform an intermediate number of write operations to the NVM storage media 30, without a need to perform garbage collection.

According to some embodiments, a processor (e.g. element 410 of FIG. 4) may be configured to receive at least one parameter (e.g. from a user interface, from the non-transitory memory device and the like) and increment the cyclic GC pointer according to at least one of: the value of the cyclic write pointer and the at least one parameter. According to some embodiments, the at least one parameter may be one of a list including: the size of data objects, frequency of data write requests (e.g. by host computer 10), the size of WUs, and a required write amplification (WA) value.

For example, processor 410 may choose to increase a frequency of GC (and consequent incrementation of the value of GC pointer 42) when: (a) the size of data objects is large; (b) the frequency of data write requests is high; (c) the size of WUs is small, and/or (d) the required write amplification is high (e.g. above a predefined threshold). In a complementary manner, processor 410 may choose to decrease the frequency of GC (and consequent incrementation of the value of GC pointer 42) when: (a) the size of data objects is small; (b) the frequency of data write requests is low; (c) the size of WUs is large; and/or (d) the required write amplification is low (e.g. above a predefined threshold).

According to experimental results, the distance between the cyclic GC pointer and the cyclic write pointer affects the ratio between user write operations and GC write operations. A small distance tends to increase the portion of GC write operations from the total number NVM write operations and increase the write amplification (WA). In a complementary manner, a large distance tends to decrease the portion of GC write operations from the total number NVM write operations and decrease the WA.

As explained above, each WU (WU) may represent a contiguous address space, including a plurality of data pages from one or more physical data blocks. According to experimental results, performing a GC operation using large WUs (e.g. WUs that include a large number of data pages) may require less GC write operations, in relation to GC operations using small WUs. As a result, when small WUs are used (e.g. to reduce the interference of write operations on user read operations), a large distance between the cyclic GC pointer and the cyclic write pointer may be preferable. In a complementary manner, when large WUs are used, the GC process may require a small number of write operations, and a small distance between the cyclic GC pointer and the cyclic write pointer may be defined.

As known to persons skilled in the art of computer storage, NVM devices 31 require auxiliary physical storage space, commonly referred to as "over-provisioning" to function properly. The additional over-provisioning storage space directly affects the WA. As an approximation, WA may be assessed according to the following equation Eq. 3:

$$WA=[(1/RESERVE\_SPACE\_RATIO)+RESERVE\_SPACE\_RATIO]/2 \qquad Eq. 3$$

where RESERVE_SPACE_RATIO is the percentage of the total storage media reserved for GC.

For example: if NVM controller 310 exposes 70% of the media and keeps 30% for GC, the WA may be approximated as $[(1/0.3)+0.3]/2 \sim 1.812$. If NVM controller 310 exposes 80% of the media, WA may be assessed as 2.6.

As known to persons skilled in the art of computer storage, the reserved storage space may not be decreased by software, as it is used internally by the NVM device 31. However, embodiments may effectively increase the reserved storage space by software if the software limits itself to writes only to a portion of the storage exposed by NVM controller 310. For example, embodiments of GFTL 40 may only enable mapping UBAs to LBA-0 thru LBA-80, when NVM media 30 is configured to receive LBA addresses LBA-0 thru LBA-100.

Figure 7:
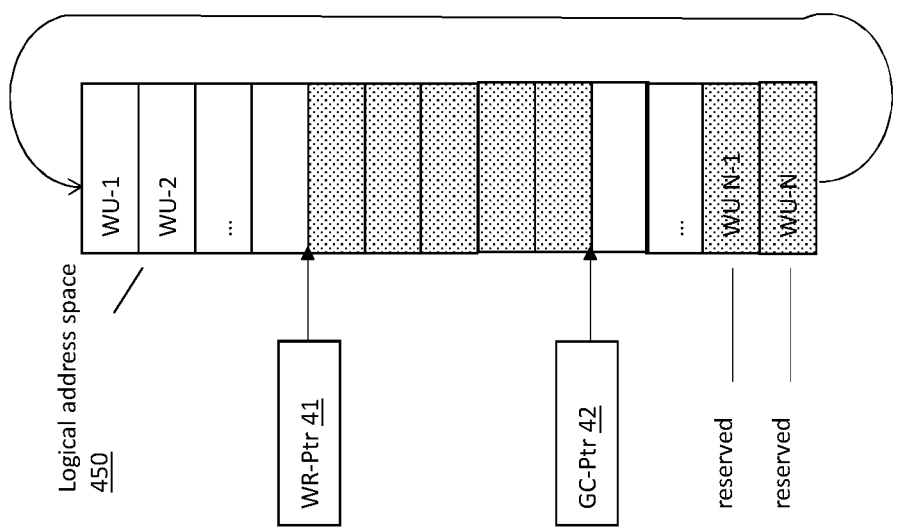
FIG. 7 is a block diagram depicting WUs that may be included in a logical address space, and WUs that are declared as reserved, which may be part of a system for managing NVM storage media, according to some embodiments.

Reference is now made to FIG. 7, which is a block diagram depicting an example of the WUs that are included within the logical address space 450. This includes WUs that are declared as reserved (e.g. WU N−1 and WU N), according to some embodiments.

A processor (e.g. element 410 of FIG. 4) may be configured to receive (e.g. via a user interface, from the non-transitory memory device and the like) a predefined percentage of WUs, that are to be kept for over-provisioning. Processor 410 may mark at least one WU (e.g. WU N−1 and WU N) as reserved for over-provisioning, according to the predefined percentage. Processor 410 may control the operation of GFTL 40 according to the marking of WUs so:

if the GC pointer points to a non-reserved WU, then perform GC and incrementing the GC pointer to the next WU;

if the GC pointer points to a reserved WU, then incrementing the GC pointer, to point to the next WU, without performing GC on the reserved WU;

if the write pointer points to a non-reserved WU, then mapping UBA of received data objects to at least one LBA within the WU until the WU is full, and then incrementing the write pointer to the next WU; and if the write pointer points to a reserved WU, then incrementing the write pointer to point to the next WU without mapping UBA of received data objects to the occupied WU, to effectively increase the over-provisioning of the NVM media.

As discussed above, when GFTL skips occupied WUs, NVM controller 310 may execute internal GC processes on NVM storage data blocks referred to by the skipped WUs.

According to some embodiments, the mechanism described above for effectively increasing NVM storage media 30 over-provisioning may be further applied to compensate for such internal GC processes, and decrease the WA: as more WUs may be marked as reserved by processor 410, the effective over-provisioning may be increased, and the WA caused by internal GC may be decreased.

According to some embodiments, processor 410 may be configured to dynamically adjust the effective over-provisioning, to accommodate a required level of WA.

For example, processor 410 may be configured to: (a) receive a required level of WA; (b) analyze the data in a metadata table (e.g. element 431 of FIG. 4) of the occupancy module (e.g. element 430 of FIG. 4), to obtain a parameter of occupancy for each WU; (c) mark WUs in which the occupancy is above a predefined occupancy threshold as occupied; (d) determine the actual WA according to at least one of: the number of occupied WUs, the number of reserved WUs, and a distance between the write pointer and the GC pointer; and (e) dynamically adjust the percentage of WUs, that are to be reserved for over-provisioning, so as to effectively adjust NVM media's 30 over-provisioning, and accommodate the required WA, e.g. according to Eq. 3.

Figure 8:
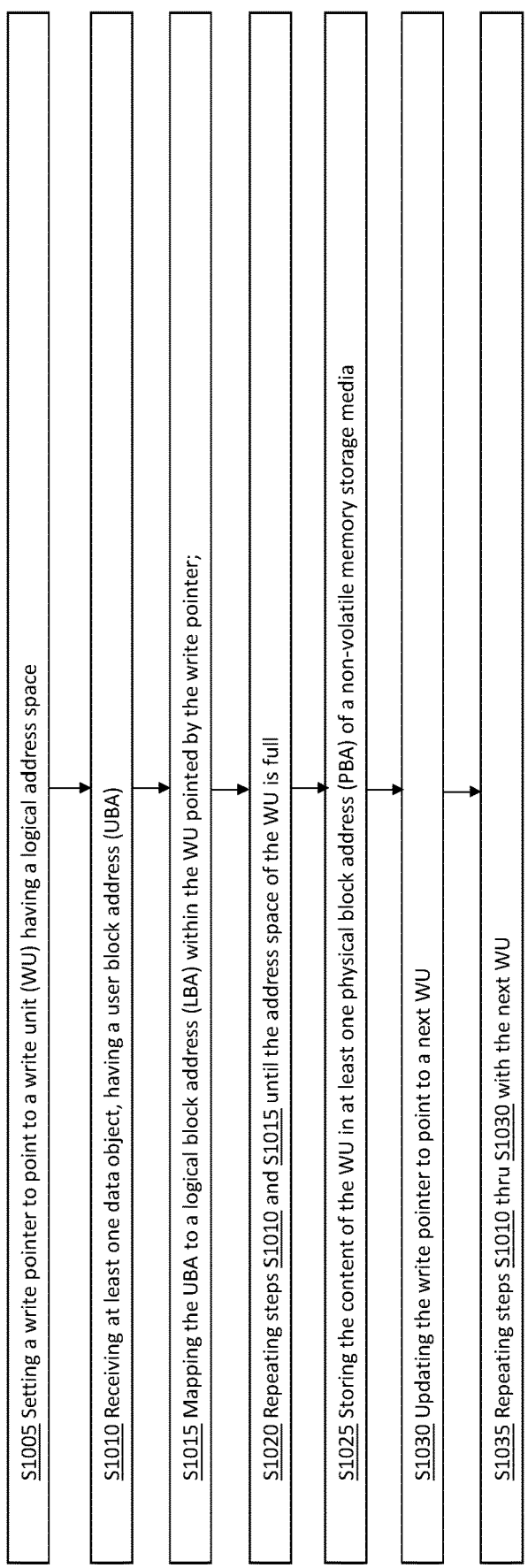
FIG. 8 is a flow diagram, elaborating a method of managing non-volatile memory (NVM) computer storage media and optimizing WA of the NVM storage media, according to some embodiments.

Reference is now made to FIG. 8, which depicts a flow diagram, elaborating a method of managing NVM computer storage media and optimizing WA of the NVM storage media, according to some embodiments.

Embodiments of the method may include defining, by a processor (e.g. element 410 of FIG. 4) a logical address space (e.g. element 450 of FIG. 4), including a plurality of logical blocks (e.g. LBA0, LBA1, etc. of FIG. 4). Each logical block may refer to at least one physical data block (e.g. PBA-N, PBA-N+1, etc. of FIG. 5A) of the NVM storage media. The logical address space 450 may be divided into a plurality of WUs (e.g. WH-0, WU-1, etc. of FIG. 4), wherein each WU represents a fixed-sized chunk of contiguous pages of the NVM storage media (e.g. elements 310-a1, 310-a2, etc. of FIGS. 3A and 3B).

In step S1005, embodiments may include setting, by processor 410, a write pointer (e.g. element 41 of FIG. 4), to point to a WU (e.g. WU-0), having a logical address space (e.g. including LBA 0 and LBA 1).

In step S1010, embodiments may include receiving (e.g. from an application 110 executed on a host computer 10), by processor 410, at least one data object, having a user block address (e.g. UBA 0).

In step S1015, embodiments may include mapping, by processor 410, the UBA (e.g. UBA 0) to an LBA (e.g. LBA 0) within the WU (e.g. WU-0) pointed by the write pointer. In some embodiments, mapping of a UBA into an LBA may include writing the content of the UBA into the address space of the LBA and updating a translation table (e.g. element 421 of FIG. 4 in translation layer 420 of FIG. 4), to translate and/or associate the UBA with the LBA.

In step S1020, previous steps S1010 (e.g. receiving data objects) and S1015 (e.g. mapping of UBAs to LBAs) may be repeated until the address space of the WU is full, (e.g. until there is no vacant space in the WU to store an additional data object received from application 110).

In step S1025, embodiments may include storing, by processor 410, the content of the WU (e.g. the at least one data object stored therein) in at least one PBA. For example, as depicted in FIG. 5A, a plurality of data object having a respective plurality of user-block address (e.g. UBA-X, UBA-X+1) may have been mapped into a plurality of LBAs (e.g. LBA0, LBA1) of a WU (e.g. WU-0). When the WU is full, its content may be stored in at least one physical block address (e.g. PBA-N, PBA-N+1), that is associated with the LBAs (e.g. LBA0, LBA1).

In step S1030, embodiments may include updating, by the processor, the write pointer to point to a next WU (e.g. WU-1 of FIG. 5A). For example, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

In step S1035, embodiments may include repeating steps S1010 thru S1030 with the next WU, e.g. according the incrementation of the WU write pointer.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Figure 9:
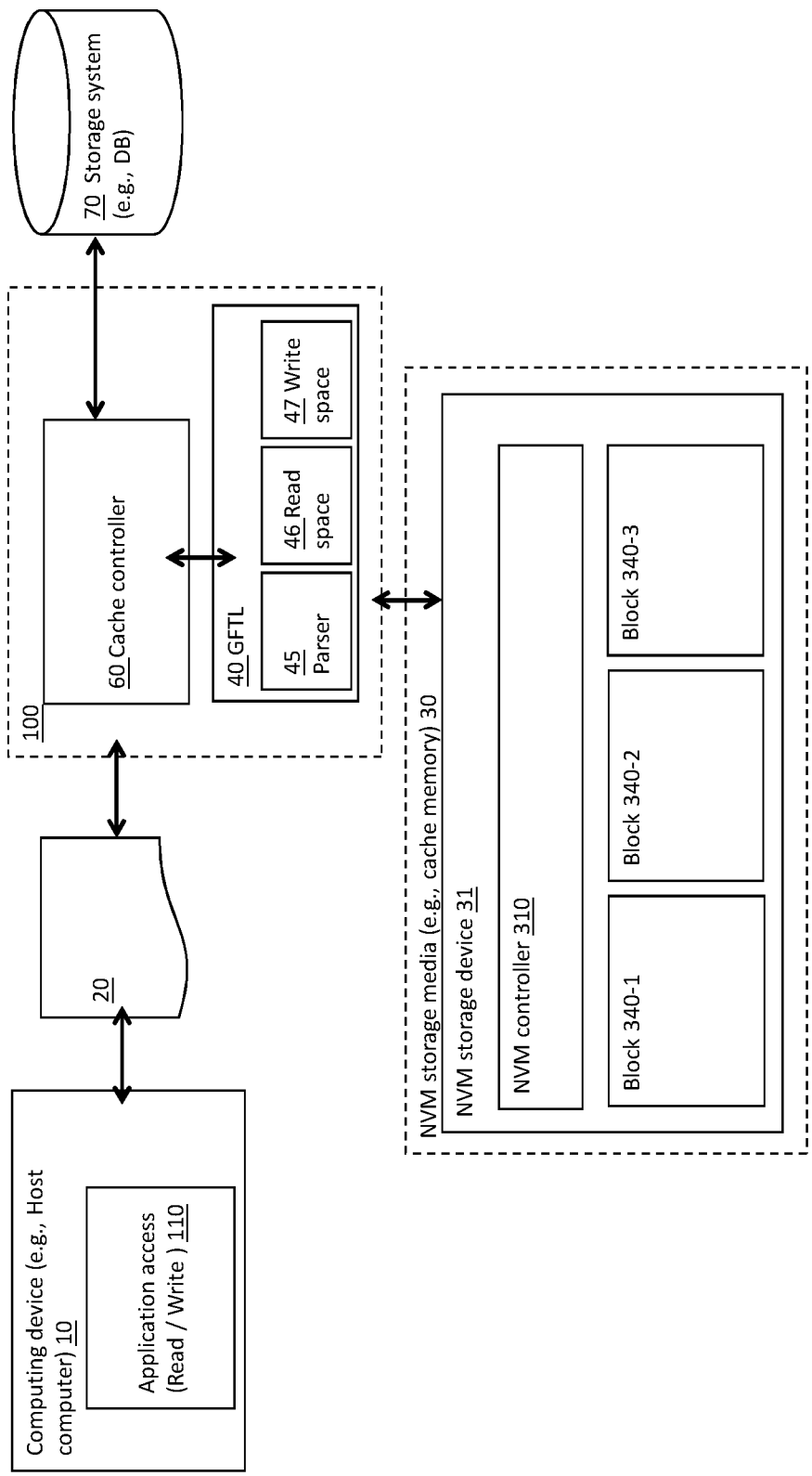
FIG. 9 is a block diagram depicting a system for managing storage of cached data objects on NVM computer storage media, according to some embodiments.

Reference is now made to FIG. 9, which is a block diagram depicting a system 100 for managing storage of cached data objects on NVM computer storage media 30 including one or more NVM storage devices 31, according to some embodiments. Additional elements and/or modules of system 100 as elaborated herein have been omitted from FIG. 9 and will not be repeated here for the purpose of clarity and brevity.

As shown in FIG. 9, at least one computing device (e.g., a host computer) may facilitate or execute at least one software process or application 110 that may require access (e.g., data read access, data write access, etc.) to one or more data elements 20 that may be stored on a data storage system 70 (e.g., a database).

According to some embodiments, the at least one computing device 10 may be communicatively connected to a storage system 70 via system 100. System 100 may be adapted to manage caching of data on at least one NVM storage device 31 of NVM storage media 30, as elaborated herein.

The at least one computing device 10 may be communicatively connected to system 100 via a first, remote connection, such as a remote computer communication network, including for example a wide area network (WAN) a local area network (LAN) and a cellular data network. According to some embodiments, system 100 may serve one or more computing devices 10, and may receive from the one or more computing devices 10 one or more access requests for storage and/or retrieval of one or more data objects 20 via the remote communication network.

System 100 may be connected or attached to at least one NVM device 31 of NVM media 30 through a local connection, including for example a Peripheral Component Interconnect Express (PCIE) bus and/or a PCIE switch (e.g., element 50 of FIGS. 3A and 3B). The connection of system 100 to the at least one NVM device 31 may be regarded as local (e.g., in contrast to a remote connection of system 100 to computing device 10), in a sense that it may not convey disaggregated data according to network limitations and constraints and may not require network-related overhead associated with transfer of data frames and/or packets therein.

As elaborated herein, GFTL 40 may be configured to locally perform (e.g., via a local data and/or address bus such as a PCIE bus connection, rather than over a computer network such as the internet) a combined process of garbage collection and cache management on the at least one NVM storage device 31 of NVM storage media 30. Due to the local connection of GFTL with the NVM media, management of cache data storage on the at least one NVM storage device 31 may not require overhead data traffic remote connection of system 100 (e.g., to a computing device 10 such as a host computer). This provides an improvement over state-of-the-art caching systems, that may handle the staleness or status of expiration of cached data in the application level on a remote computing device (e.g., computing device 10), and may thus require repetitive access over a computer communication network (e.g., an organizational Ethernet network) that may lead to data traffic congestion.

System 100 may further be connected via a third connection to storage system 70 (e.g., a database) and may manage caching of data stored on storage 70, in relation to computing device 10.

In other words, system 100 may store a first copy of at least one data element 20 on database 70, and a second copy of the at least one data element 20 on an NVM-based cache memory device 31. System 100 may be configured to retrieve the value of the at least one data element 20 or a reference (e.g., a pointer) thereto upon request (e.g., a data read request) from computing device 10 (e.g., from application 110 executed therein). As known to persons skilled in the art, system 100 may be adapted to prioritize or prefer retrieval of the stored data element according to the latency of retrieval. For example, System 100 may be configured to primarily retrieve the copy of data object 20 from a local cache (e.g., from NVM device 31), and only retrieve the copy of data object 20 from the database if the copy on the NMV cache 31 is invalid, expired or non-existent, as elaborated herein.

According to some embodiments, system 100 may receive (e.g., from computing device 10) at least one data object 20 for storage on a storage system 70 (e.g., a database).

According to some embodiments, data object 20 may include a content of one or more data elements, such as a value of a variable, a content of a file, a content of a volume and the like to be stored. Additionally, or alternatively, data object 20 may include one or more metadata elements pertaining to the one or more data elements. For example, storage system 70 may be configured to store one or more data objects 20 according to a key/value storage scheme as known in the art and so data object 20 may include one or more 'key' metadata elements and one or more respective 'value' data elements.

According to some embodiments, the one or more received data objects 20 may include (e.g., as part of the one or more metadata elements) a respective or associated time-to-live (TTL) value or other value, representing an expiration time of the received data element. For example, in a condition where a user or an application may access a storage system to store the data object according to a key/value storage scheme as known in the art, the TTL metadata value may be included within the data object's key metadata.

According to some embodiments, application 110 may be configured to set the TTL value globally, (e.g., as in a UTC time-stamp format), relatively (e.g., in relation to another, predefined point in time) or as a duration (e.g., a duration since the storage of the relevant data object).

Additionally, or alternatively, application 110 may be configured to set a TTL based on specific data types (e.g., according to a predefined configuration of the application), thus determining the time of expiration for elements of the respective data types. For example, an application 110 that handles personal contact details in a social network may be configured (e.g., by an administrative user) to set a TTL of contact details of a 'friend' to expire 1 year after the date of storage. In another example, an artificial intelligence (AI) based application 110 that may be adapted to predict a user's taste in clothing may be configured (e.g., via input device 7 of FIG. 1) to set a TTL of data pertaining to previous choices of the user to 1 month after the date of storage, etc.

System 100 may include a cache controller module 60, that may be configured to determine whether to cache (e.g., to store on an NVM-based cache memory device 31) the received data object 20, as known in the art.

Additionally, or alternatively, cache controller 60 may be configured to calculate and/or set the TTL time. For example, cache controller 60 may receive the request to store data object 20 and calculate a future expiration time TTL based on the type of data object and the present time. Pertaining to the example of the social network 'friend', cache controller 60 may calculate and/or set the TTL to be one year from the time of receiving data object 20.

In embodiments where data object 20 (e.g., a data structure such as a table) may include a plurality of data elements (e.g., entries or fields in the data structure), cache controller 60 may receive and/or compute one or more respective TTLs (e.g., one TTL per each data element included in data object 20). For example, cache controller 60 may associate a first TTL with a first data element, associate a second TTL with a second data element, etc.

As explained herein, in relation to FIG. 4, data object 20 may have or may be associated with a virtual address in the application's address space. The virtual address may for example, include a namespace (e.g., a virtual drive, as known in the art) and a virtual user block address (UBA), which is an offset from the namespace within the application address space.

As explained herein, in relation to FIG. 4, the PBAs of the storage media may be represented by respective logical block addresses (LBAs) in a logical address space, and the LBAs may be organized in write units (WUs), each including one or more LBAs.

GFTL 40 may be configured to map the UBA to an LBA that may be included in a write unit (WU) pointed by write pointer 41. According to some embodiments, mapping the UBA to an LBA may include: (a) writing the content of the UBA (e.g., the content of the received one or more data objects 20, including metadata such as the TTL metadata) to at least one LBA within the WU pointed by write pointer 41; and (b) updating a translation table (e.g. element 421 of FIG. 4) accordingly, to translate and/or associate the UBA of received data element 20 with the respective LBA, as elaborated in relation to FIG. 4.

As explained herein, in relation to FIG. 4, GFTL 40 may:
continue writing content of UBAs (e.g., data and metadata associated with one or more data objects 20) until the WU pointed by write pointer 41 is full;
store the content of the one or more LBAs (e.g., the one or more data objects and respective metadata such as TTL values) included in the WU pointed by write pointer 41 on respective one or more physical block addresses (PBAs) of the storage media (e.g., PBAs represented by the LBAs in logical address space 450); and
increment write pointer 41 to point to the next WU, in a serial, cyclic order.

As explained herein, in relation to FIGS. 4, 5A and 5B, GFTL 40 may perform a garbage collection process on one or more PBAs of the storage media based on the validity of stored data elements. For example:

occupancy module 430 may be configured to continuously monitor mapping of data objects to LBAs, and garbage collection from LBAs within;

occupancy module 430 may maintain at least one of: an updated status of validity of each data page within each LBA and an updated status of occupancy for each WU; and GFTL 40 may perform garbage collection by for example aggregating valid data pages from a first LBA in a first WU pointed by GC pointer 42 to a second LBA in a second WU pointed by write pointer 41.

The garbage collection process may include (a) setting GC pointer 42 to point to a first WU of the logical address space; (b) reading content of valid, non-expired data from one or more PBAs that are represented by the first WU; (c) writing the read content to one or more PBAs represented by a second WU of the logical address space (e.g., the WU pointed by write pointer 41); and (d) updating the value of GC pointer 42 sequentially to point to a subsequent WU in the logical address space.

As elaborated herein, in relation to FIGS. 6A, 6B, 6C and 7, updating of GC pointer 42 may be performed in a cyclical order, over at least a subset of WUs of the logical address space 450. The term subset is used herein to refer to the entire logical address space 450 or a part of the address space with the exclusion of one or more WUs (e.g., reserved WUs and/or occupied WUs, as explained herein). Updating of GC pointer 42 may be performed in a cyclical order in a sense that it may follow a serial order of WUs from a first WU to a last WU of the subset of WUs of the logical address space 450 and roll back to the first WU.

As elaborated herein, in relation to FIGS. 6A, 6B, 6C and 7, writing the read content may include: (a) setting write pointer 41 to point to a WU of the logical address space; (b) writing the read content to one or more PBAs represented by the second WU; and (c) updating the write pointer in a cyclical order, over the subset of WUs of the logical address space 450, so as to 'follow' the advancement of GC pointer 42.

Additionally, or alternatively, GFTL 40 may perform a garbage collection process on one or more PBAs of the storage media based on at least one TTL value stored at a PBA of the storage media (e.g., purge data objects that have expired, as indicated by their respective TTLs), as explained herein.

As shown in FIG. 9, According to some embodiments, GFTL 40 may include one or more of: (a) a read memory address space 46; (b) a write memory address space 47; and (c) a parser module 45.

GFTL 40 may be configured to read the content of at least one data object 20 stored on one or more first PBAs of NVM storage device 31 that are represented by respective one or more first LBAs, that are included in a WU pointed by GC pointer 42. According to some embodiments, reading the content of at least one data object may include copying the read data object to read memory address space 46.

The read data content may contain data of valid and invalid pages (e.g. new data-objects and overwritten data objects respectively). The read data content may also contain expired and non-expired data elements (e.g., data elements having or associated with a TTL value that represents a real-world time that has already elapsed, or that has not yet elapsed, respectively).

Parsing module 45 may be configured to parse the one or more read data objects to extract one or more TTL value associated with or respective to the one or more read data objects, stored in the one or more first PBAs. According to some embodiments, parsing module 45 may be configured to determine a status of expiration of storage of one or more read data objects, as one of expired and non-expired, based on the respective extracted TTL values. Additionally, or alternately, parsing module 45 may mark (e.g., by a dedicated, Boolean flag in read address space 46) data objects according to their determined status of expiration. For example, parsing module 45 may determine data objects that are associated with a TTL value that has already elapsed (e.g. by determining the TTL value is earlier and thus in the past when compared to a current actual time) as expired and mark them as such (e.g., by the Boolean flag) and determine data objects that are associated with a TTL value that has not yet elapsed as non-expired and mark them as such (e.g., by the Boolean flag).

As elaborated herein, in relation to FIG. 4, GFTL 40 may be configured to monitor mapping of UBAs of data objects onto respective LBAs and maintain a status of validity of each data page within each LBA (e.g., on metadata table 431). In other words, GFTL 40 may monitor write operations of data objects on the NVM storage media 30 and maintain a status of validity of storage of data objects thereat, as one of valid and invalid, based on the monitored write operations.

GFTL 40 may manage the storage of the received one or more data objects on PBAs of the storage media based on at least one of: the status of validity of one or more data objects and/or the TTL or status of expiration of one or more data objects, as elaborated herein.

GFTL 40 may copy valid, non-expired data pages (e.g., data pages that correspond to data objects that are marked as valid in metadata table 431 and marked as non-expired in read address space 46) from read memory address space 46 to write memory address space 47. According to some embodiments, copying of data from read memory address space 46 to write memory address space 47 may be performed as peer-to-peer data transfer or as direct memory access (DMA) data transfer, so as not to consume computational resources of GFTL 40 (e.g. without accessing processor element 410 of FIG. 4 and without consuming memory space of memory element 411 of FIG. 4).

GFTL 40 may continue or repeat to process of reading data of PBAs into read memory address space 46 and copying valid, non-expired data therefrom to write address space 47 until the amount of copied data in write memory address space 47 reaches a predefined threshold (e.g. when the amount of copied data content reaches the size, or storage capacity of a WU or until a subsequent data object may not be accommodated within the remaining write memory address space 47.

According to some embodiments, when the amount of data content (e.g., content of valid, non-expired data objects) copied to the write address space reaches the predefined threshold as elaborated herein, GFTL 40 may store the content of write memory address space 47 on the NVM storage device in one or more PBAs that may be represented by LBAs of the WU pointed by write pointer 41. Thus, GFTL 40 may manage storage of received one or more data objects 20 on PBAs of the storage media 30, based on the determined status of expiration. In other words, GFTL 40 may manage storage of received one or more data objects 20 in a sense that GFTL 40 may determine that one or more data objects may be purged from storage media 30, based on the elapsed time since reception and/or storage of the one or more received data objects 20.

As elaborated herein, GFTL 40 may be configured to perform garbage collection from a first WU pointed by GC pointer 42 to a second WU pointed by write pointer 41. As elaborated herein the GC process may be performed by copying content of valid, non-expired data pages of the first WU (e.g., from data pages of PBAs that are represented by LBAs included in the first WU) to the second WU (e.g., to data pages of PBAs that are represented by LBAs included in the second WU). According to some embodiments, GFTL 40 may subsequently mark the first WU as empty (e.g., in metadata table 431), thus marking one or more respective PBAs of the first WU as empty.

GFTL 40 may further manage storage of received one or more data objects 20 on PBAs of the storage media 30 by erasing empty PBAs (e.g., by employing a background erasure process), as known in the art. In other words, GFTL 40 may manage storage of one or more data objects 20 on one or more NVM devices 31 by swiping, purging or evicting of data objects 20 that are:

non-valid (e.g., that have been rewritten, deleted or updated); and/or expired (e.g., having the real-world time represented by TTL elapsed).

Figure 10:
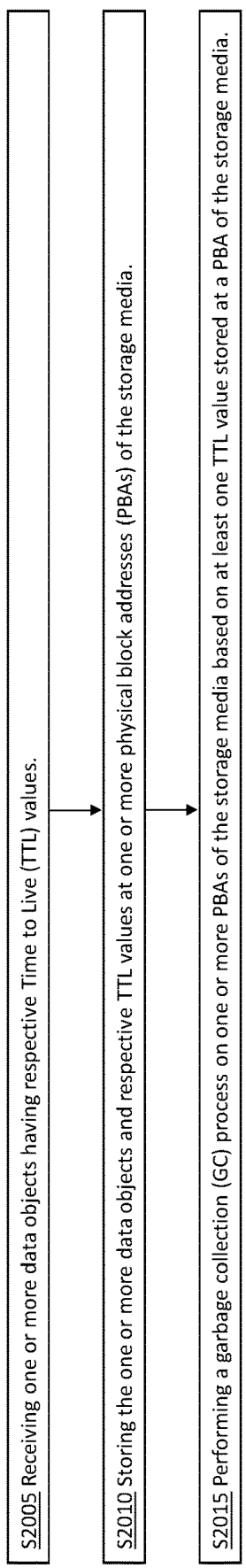
FIG. 10 is a flow diagram, depicting a method of managing storage of cached data objects on NVM computer storage media, according to some embodiments.

Reference is now made to FIG. 10, which depicts a flow diagram, elaborating a method of managing storage of cached data objects on NVM computer storage media, by at least one processor, according to some embodiments.

As shown in step S2005, the at least one processor (e.g., element 2 of FIG. 1) may receive (e.g., for storage on NVM storage media such as element 30 of FIG. 3A) one or more data objects (e.g., a data structure, a file, an entry in a database and the like). The one or more data objects may have one or more respective TTL values, defining a period of relevance, after which the one or more data objects may be considered stale or expired, as known in the art.

As shown in step S2010, the at least one processor may store the one or more data objects and respective TTL values at one or more PBAs of the storage media. For example, as elaborated herein, the one or more data objects may be stored in conjunction with the respective TTL values on one or more PBAs of storage media 30.

As shown in step S2015, the at least one processor may perform a garbage collection (GC) process on one or more PBAs of the storage media based on at least one TTL value stored at a PBA of the storage media. For example, embodiments of the invention may purge or evict data that may be stored and expired from one or more data storage devices 31, according to the respective TTL value, as elaborated herein.

Embodiments of the invention provide an improvement over state-of-the-art data storage systems by facilitating a practical application for evicting or purging expired, cached data objects, while avoiding additional read amplification, write amplification, code complexity overhead and/or network overloading, as elaborated herein.

As elaborated herein, embodiments may store TTL data in conjunction with respective data objects on NVM storage media 30, and manage cache storage operations (e.g., manage purging or eviction of stored, expired data elements) therefrom at the GC level (e.g., at a level that may directly relate to the physical storage media). Such implementation may provide an improvement over state-of-the-art caching systems that may manage caching at an application level, such as an application that may be executed on a remote host computer (e.g., such as element 10 of FIG. 2). Thus, embodiments of the invention may require reduced computational, communicational and/or structural overhead in comparison to state-of-the-art caching systems.

The invention claimed is:

1. A method of managing storage of cached data objects on a non-volatile memory (NVM) computer storage media comprising at least one NVM storage device, by at least one processor, the method comprising:

receiving one or more data objects having respective Time to Live (TTL) values;

storing the one or more data objects and respective TTL values at one or more physical block addresses (PBAs) of the storage media; and performing a garbage collection (GC) process on one or more PBAs of the storage media based on at least one TTL value stored at a PBA of the storage media, wherein the PBAs are represented by respective logical block addresses (LBAs) in a logical address space, and wherein the LBAs are organized in write units (WUs), each comprising one or more LBAs, and wherein the GC process further comprises:

a. setting a GC pointer to point to a first WU of the logical address space;

b. reading content of valid, non-expired data from one or more PBAs that are represented by the first WU;

c. writing the read content to one or more PBAs represented by a second WU of the logical address space; and d. updating the GC pointer value sequentially, to point to a subsequent WU in the logical address space.

2. The method of claim 1, wherein the GC process comprises:

reading the content of the one or more PBAs;

parsing the read data to extract one or more TTL values of respective one or more data objects stored in the one or more PBAs; and determining a status of expiration of storage of one or more data objects, as one of expired and non-expired, based on the respective extracted TTL values.

3. The method of claim 2, further comprising:

monitoring write operations of data objects on the NVM storage media; and maintaining a metadata table that associates between one or more PBA addresses and a respective status of validity of storage of data objects thereat, as one of valid and invalid, based on the monitored write operations.

4. The method of claim 1, wherein the one or more data objects are received from a remote computing device via a communication network, and wherein the GC process is performed locally by the at least one processor on the at least one NVM storage device.

5. The method of claim 1, further comprising repeating steps b, c and d, wherein updating the GC pointer is performed in a cyclical order, over a subset of WUs of the logical address space.

6. The method of claim 5, wherein writing the read content further comprises:

setting a write pointer to point to the second WU of the logical address space;

writing the read content to one or more PBAs represented by the second WU; and updating the write pointer in a cyclical order, over the subset of WUs of the logical address space.

7. The method of claim 1, further comprising marking the PBA represented by the first WU as empty.

8. The method of claim 1, wherein the one or more data objects is described by a user block address (UBA) and wherein storing a data object and respective TTL value further comprises mapping the UBA to one or more LBAs and storing the data object and respective TTL value on the NVM storage media at the one or more PBAs represented by the one or more LBAs.

9. A system for managing storage of cached data objects on a NVM computer storage media comprising at least one NVM storage device, the system comprising: a non-transitory memory device, wherein modules of instruction code are stored, and at least one processor associated with the memory device, and configured to execute the modules of instruction code, whereupon execution of said modules of instruction code, the at least one processor is further configured to perform at least one of:
  receive one or more data objects having respective TTL values;
  store the one or more data objects and respective TTL values at one or more PBAs of the storage media;
  represent PBAs of the storage media by respective LBAs in a logical address space;
  organize LBAs in WUs, each comprising one or more LBAs; and
  perform a GC process on one or more PBAs of the storage media based on at least one TTL value stored at a PBA of the storage media, by:
  a. setting a GC pointer, to point to a first WU of the logical address space;
  b. reading content of valid, non-expired data from one or more PBAs that are represented by the first WU;
  c. writing the read content to one or more PBAs represented by a second WU of the logical address space; and
  d. updating the GC pointer value sequentially, to point to a subsequent WU in the logical address space.

10. The system of claim 9, wherein the at least one processor is further configured to perform the GC process by:
  reading the content of the one or more PBAs;
  parsing the read data to extract one or more TTL values of respective one or more data objects stored in the one or more PBAs; and
  determining a status of expiration of storage of one or more data objects, as one of expired and non-expired, based on the respective extracted TTL values.

11. The system of claim 10, wherein the at least one processor is further configured to:
  monitor write operations of data objects on the NVM storage media; and
  maintain a metadata table that associates between one or more PBA addresses and a respective status of validity of storage of data objects thereat, as one of valid and invalid, based on the monitored write operations.

12. The system of claim 9, wherein the at least one processor is further configured to:
  receive the one or more data objects from a remote computing device via a communication network; and
  perform the GC process locally, on the at least one NVM storage device.

13. The system of claim 9, wherein the at least one processor is further configured to:
  repeat steps b, c and d; and
  update the GC pointer in a cyclical order, over a subset of WUs of the logical address space.

14. The system of claim 13, wherein the at least one processor is further configured to write the read content by:
  setting a write pointer to point to the second WU of the logical address space;
  writing the read content to one or more PBAs represented by the second WU; and
  updating the write pointer in a cyclical order, over the subset of WUs of the logical address space.

15. The system of claim 9, wherein the at least one processor is further configured to mark the PBA represented by the first WU as empty.

16. The system of claim 9, wherein the one or more data objects is described by a UBA and wherein the at least one processor is further configured to store a data object and respective TTL value by:
  mapping the UBA to one or more LBAs; and
  storing the data object and respective TTL value on the NVM storage media at the one or more PBAs represented by the one or more LBAs.

* * * * *